United States Patent
Stroupe

(10) Patent No.: US 9,996,915 B2
(45) Date of Patent: Jun. 12, 2018

(54) AUTOMATED FORENSIC ARTIFACT RECONSTRUCTION AND REPLAY OF CAPTURED AND RECORDED DISPLAY INTERFACE STREAMS

(71) Applicant: Altia, Inc., Colorado Springs, CO (US)

(72) Inventor: William J. Stroupe, Colorado Springs, CO (US)

(73) Assignee: Altia, Inc., Colorado Springs, CO (US)

( * ) Notice: Subject to any disclaimer, the term of this patent is extended or adjusted under 35 U.S.C. 154(b) by 147 days.

(21) Appl. No.: 15/228,737

(22) Filed: Aug. 4, 2016

(65) Prior Publication Data

US 2018/0040114 A1 Feb. 8, 2018

(51) Int. Cl.
| | |
|---|---|
| *G09G 5/02* | (2006.01) |
| *G06T 7/00* | (2017.01) |
| *G06F 3/0481* | (2013.01) |
| *G06T 1/20* | (2006.01) |
| *G09G 3/18* | (2006.01) |

(52) U.S. Cl.
CPC .......... *G06T 7/0002* (2013.01); *G06F 3/0481* (2013.01); *G06T 1/20* (2013.01); *G09G 3/18* (2013.01)

(58) Field of Classification Search
None
See application file for complete search history.

(56) References Cited

U.S. PATENT DOCUMENTS

| | | |
|---|---|---|
| 6,957,418 B2 | 10/2005 | Batcha et al. |
| 8,918,748 B1 | 12/2014 | Chiu et al. |
| 2002/0161563 A1 | 10/2002 | Elabiad |
| 2004/0027378 A1 | 2/2004 | Hays et al. |
| 2004/0158577 A1 | 8/2004 | Chu et al. |
| 2006/0073455 A1 | 4/2006 | Buyl et al. |
| 2007/0234308 A1 | 10/2007 | Feigenbaum et al. |

(Continued)

OTHER PUBLICATIONS

U.S. Appl. No. 14/677,651, NonFinalOA dated Sep. 13, 2017, 39 pages.

(Continued)

*Primary Examiner* — Xiao Wu
*Assistant Examiner* — Mohammad H Akhavannik
(74) *Attorney, Agent, or Firm* — Swanson & Bratschun, L.L.C.

(57) ABSTRACT

Novel tools and techniques might provide for implementing user interface validation or diagnostics, and, in particular embodiments, for implementing automated forensic artifact reconstruction and replay of captured and recorded display interface streams. In some embodiments, a computing system might retrieve stream data from a database, the stream data having been captured and recorded by a data stream recording system as display data is being sent from an embedded processor of a graphical user interface ("GUI") system to a display device, without disturbing the display data being sent. The computing system subsequently parses pixel data from the display data, formats the parsed pixel data, reconstructs one or more display screen images based at least in part on the formatted pixel data, then compares each pixel of each screen image or frame of the reconstructed display screen images with each pixel of a model screen image of each corresponding screen image.

11 Claims, 10 Drawing Sheets

(56) References Cited

U.S. PATENT DOCUMENTS

| | | | |
|---|---|---|---|
| 2010/0167809 A1* | 7/2010 | Perlman | A63F 13/12 |
| | | | 463/24 |
| 2010/0174687 A1 | 7/2010 | Krishnaswamy et al. | |
| 2010/0174992 A1* | 7/2010 | Portman | G06F 9/4443 |
| | | | 715/738 |
| 2011/0188767 A1* | 8/2011 | Cheng | H04N 19/503 |
| | | | 382/236 |
| 2011/0208339 A1 | 8/2011 | Tarte et al. | |
| 2012/0089933 A1 | 4/2012 | Garand et al. | |
| 2013/0174128 A1 | 7/2013 | Kansal | |
| 2014/0258872 A1* | 9/2014 | Spracklen | H04L 41/5009 |
| | | | 715/736 |
| 2015/0281113 A1 | 10/2015 | Siciliano et al. | |
| 2015/0286374 A1 | 10/2015 | Dibble et al. | |

OTHER PUBLICATIONS

U.S. Appl. No. 14/677,651, NonFinalOA dated Apr. 17, 2018, 39 pages.

* cited by examiner

AUTOMATED FORENSIC ARTIFACT RECONSTRUCTION AND REPLAY OF CAPTURED AND RECORDED DISPLAY INTERFACE STREAMS

CROSS-REFERENCES TO RELATED APPLICATIONS

This application may be related to U.S. patent application Ser. No. 14/677,651 (the "'651 application"), filed Apr. 2, 2015 by Kevin S. Dibble et al., entitled, "Embedded System User Interface Design Validator," which claims priority to U.S. Patent Application Ser. No. 61/975,158 (the "'158 application"), filed Apr. 4, 2014 by Kevin S. Dibble et al., entitled, "Embedded System User Interface Design Validator."

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and computer software for implementing user interface validation or diagnostics, and, in particular embodiments, to methods, systems, and computer software for implementing automated forensic artifact reconstruction and replay ("FARR") of captured and recorded display interface streams ("CARDIS").

BACKGROUND

An "embedded system" is a computer with a dedicated function that operates within a more complex system, which can be mechanical or electrical in nature (including a larger computer system), with the embedded system "embedded" as part the more complex system that also includes other hardware and/or mechanical components. Examples of embedded systems include vehicle control systems and instrument clusters are discussed in further detail in this document and in the '651 and '158 applications (which have already been incorporated herein by reference in their entirety). Many other examples exist as well, including, without limitation, systems embedded in household appliances, medical instruments, industrial equipment, and the like.

Relative to general purpose computers, embedded systems typically are characterized by low power consumption, small size, and/or low cost. These advantages, however, are balanced by the limited processing resources available to such systems, with the result that embedded systems often are significantly more difficult to program and to interface with than general purpose computers. Consequently, many embedded systems did not provide user interfaces. If such interfaces were required, they often were quite simple in nature, such as physical switches, analog displays, and/or the like.

More recently, however, embedded systems have become increasingly complex and many offer a far higher degree of user interaction. One example is an instrument gauge cluster for an automobile. In the past, such clusters generally have been groups of analog gauges with direct input from analog sensors in the vehicle. Now, however, many instrument clusters are computing devices with digital screens (which often emulate analog gauges) and a variety of different user input mechanisms. Automotive manufacturers seek to provide as many features in such devices as possible, subject to a number of restraints, such as the need for real-time output, limited computing resources, and differences between models and platforms.

As these embedded systems become more and more complex, however, testing of these systems becomes more difficult, particularly if they must be tested manually by a technician or the like. In particularly, testing of embedded human-machine interfaces ("HMIs"; also referred to as graphical user interfaces ("GUIs") and/or the like) prior to their release into the manufacturing stream in the automotive, medical, industrial, and/or other markets is currently not automated. These HMIs are most often very complex, consisting of many different screens and sub-screens with complex animated graphics being displayed on each screen. Tremendous costs are incurred in terms of time, effort, and money in manually testing such HMIs to verify compliance with requirements before these HMI systems enter the marketplace Hence, there is a need for more robust and scalable solutions for implementing user interface validation or diagnostics, and, in particular embodiments, to methods, systems, and computer software for implementing automated forensic artifact reconstruction and replay ("FARR") of captured and recorded display interface streams ("CARDIS").

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Overview

Figure 1:
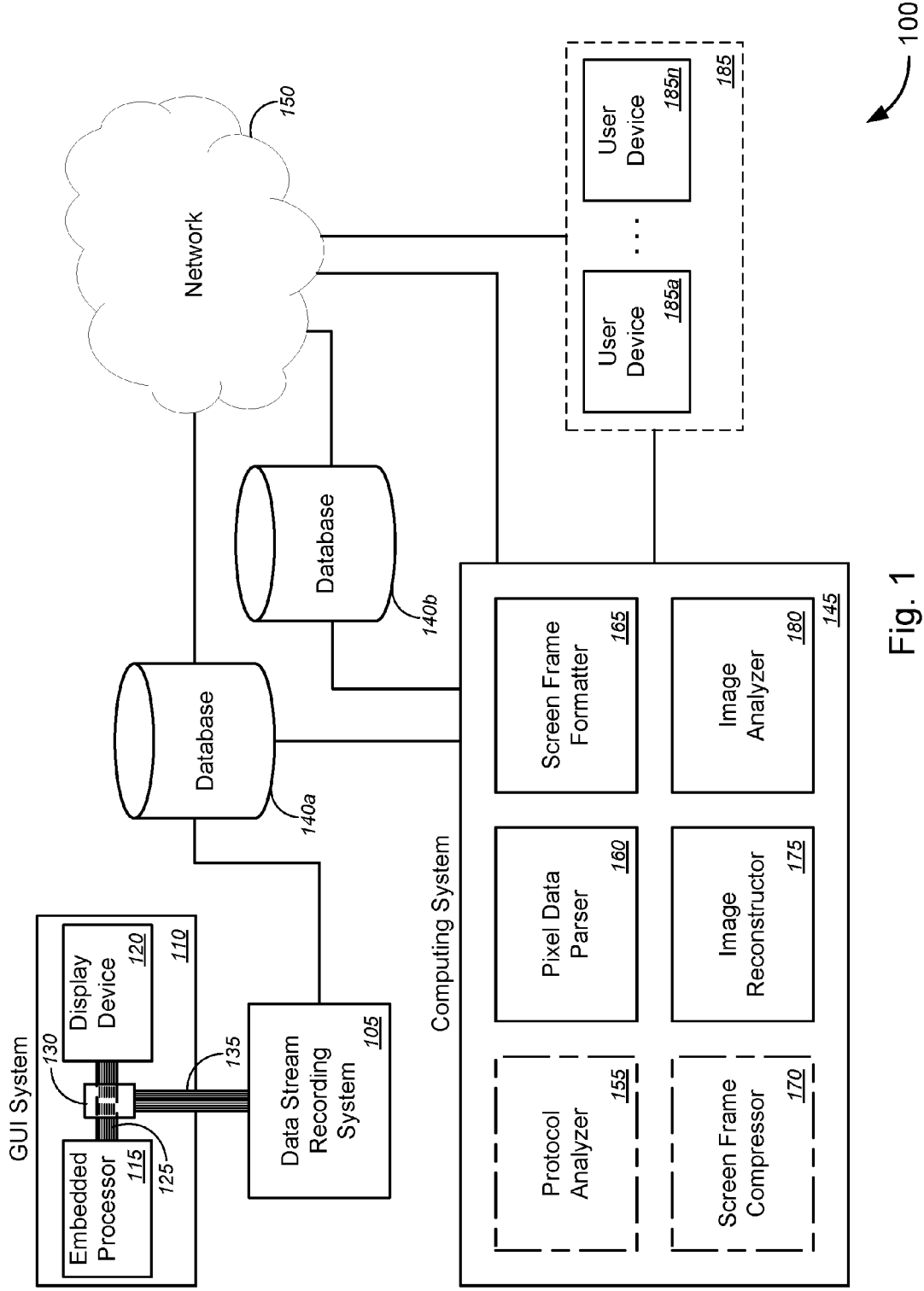
FIG. 1 is a schematic diagram illustrating a system for implementing automated forensic artifact reconstruction and replay ("FARR") of captured and recorded display interface streams ("CARDIS"), in accordance with various embodiments.

Various embodiments provide tools and techniques for implementing user interface validation or diagnostics, and, in particular embodiments, to methods, systems, and computer software for implementing automated forensic artifact reconstruction and replay ("FARR") of captured and recorded display interface streams ("CARDIS").

In various embodiments, a computing system (e.g., a FARR system) might retrieve stream data from a database, the stream data having been captured and recorded by a data stream recording system (e.g., a CARDIS system) as pixel data is being sent from an embedded processor of a graphical user interface ("GUI") system to a display device, without disturbing the pixel data being sent. The computing system subsequently parses pixel data from the stream data, formats the parsed pixel data, reconstructs one or more display screen images based at least in part on the formatted pixel data, then compares each pixel of each screen image or frame of the reconstructed display screen images with each pixel of a model screen image of each corresponding screen image of the one or more display screen images that were displayed on the display device.

The following section describes in detail the processes involved with the CARDIS-FARR system.

Combined CARDIS and FARR System

The combined CARDIS and FARR system utilizes a hardware and software solution for recording raw electronic display data (e.g., LCD data or the like) to be displayed on a display device, for parsing the recorded data, for reconstructing images that appeared on the display device during a recording session, and for comparing image-to-image the reconstructed images with corresponding baseline images to validate or diagnose the images that appeared on the display device during the recording session.

Together, these two aspects of the system permit pixel-perfect reconstruction of any set of images that once appeared on any embedded display device (e.g., LCD or the like). This, in turn, provides a basis for automated testing of embedded GUIs or HMIs because image data (e.g., LCD image data) can be captured from any test run, and can be reconstructed into images, which can then be automatically compared against a baseline collection of similar images that have been certified as a gold standard.

(1) CARDIS—Capture and Record Display Interface Stream

Every embedded hardware system with a LCD, for example, includes a Display Interface Controller whose task is to encode pixel data into electronic signals. The input to the Display Interface Controller is the graphics processor, which produces graphics pixels in a raw data format. The output of the Display Interface Controller is a stream (whether serial or parallel) of electronic signals, in any number of established protocols, which perfectly represents the raw pixel data. This stream of electronic signals is delivered downstream to the LCD, whose task is to convert the signals into human-viewable pixels on its display screen.

The entire signal stream that drives the LCD must be accurately recorded in real time, without disturbing the normal operation of the LCD or its surrounding embedded microprocessor system. In order to do that, physical electronic connections must be made to the signal ribbon cable which is attached to the LCD. These electronic connections are then routed to a data stream recording system.

However, in order to make the connections to the LCD ribbon cable in the first place, a special pass-through breakout connector is placed in series with the LCD ribbon cable. This pass-through breakout connector allows the recording system to "sniff" and record the signals passing through the LCD ribbon cable, without disturbing them in any way. The resulting recording file consists of a stream of binary data, with each bit representing the state (i.e., "0" or "1") at the moment of capture of each physical recording wire that is connected to the pass-through breakout connector. The recording wires are connected in logical order to ensure that the recorded bits of data are arranged correctly in the recording file, with the least significant bit ("LSB") at the rightmost position, and the most significant bit ("MSB") at the leftmost position. This ensures that the software parser sees the data in its correct format.

(2) FARR—Forensic Artifact Reconstruction and Replay

FARR comprises a complex software parser (which can be written in any suitable programming language, including, but not limited to, as Java™, C, C#™ or C++, and/or any scripting language, such as Perl, Python, or TCL, as well as combinations of any programming and/or scripting languages), which reads the recording file and deciphers the data, reconstructing all the images that once appeared on the LCD.

The recording file contains display data (which might comprise binary data, pixel data, and/or the like), which not only represents each and every single pixel that once appeared on the LCD, but also contains formatting data including synchronization signals (such as Pixel Clock, Vertical Sync, Horizontal Sync, Data Enable, etc.) which were used to tell the LCD exactly where each pixel should be displayed on the LCD, and signals which tell the LCD when to begin a new screen frame or screen row. In addition, for certain types of displays, other low-level command data and encoding data may also appear in the recording. All these data must be correctly decoded, deciphered, and applied during the process of reconstructing the images that once appeared on the display.

The FARR parser performs all these tasks. The input to the parser is a recording file (e.g., a binary recording file) that is produced by the CARDIS component of the system, and the output of the parser is a sequence of images, which can be in any suitable graphics or image file format, including, but not limited to, the portable network graphics ("PNG") format, the joint photographic experts group ("JPEG") format, the tagged image file format ("TIFF"), the better portable graphics ("BPG") format, the computer graphics metafile ("CGM") format, the Gerber format, the scalable vector graphics ("SVG") format, and/or the like.

The FARR parser first analyzes the recording file header, which provides important reference data about the recording. It then begins to read the data (e.g., binary data) in the recording in order to decipher patterns in the pixel and synchronization data—this step allows the parser to determine what low-level protocols were used by the embedded system to organize and encode the pixel data and the synchronization signals. There exist today in the embedded world many different low-level protocols that are used to encode LCD data. A few of these include Parallel RGB, low-voltage differential signaling ("LVDS"), etc. Within each of these protocols, there may exist additional variations and sub-protocols. The FARR parser reads enough data from the recording file to clearly establish which protocols and sub-protocols were being employed when the recording was produced.

Once the parser establishes the correct protocols in use, it then reads the recording from the beginning of the pixel data, and reads one full LCD screen frame of data at a time. Each screen frame corresponds to one full image of the LCD screen. The parser then organizes this data into pixels in rows across the screen, with the exact number of pixels in each row, and the exact number of rows, with the exact color depth of each pixel, to correspond precisely with the physical layout and color rendering characteristics of the LCD on the embedded system where the CARDIS recording was made.

Once a screen frame of pixel data is deciphered and organized as above, it is then passed to the image reconstructor within the parser. This portion of the FARR parser translates the screen frame into an image (e.g., PNG image, JPEG image, TIFF image, BPG image, CGM image, Gerber image, SVG image, or the like), and saves this newly-reconstructed image to disk, with a name that contains the sequence number designating the relative sequence of when this image actually appeared on the LCD.

The above-described process continues until the entire recording file has been processed, and all images that once appeared on the LCD have been reconstructed. Depending upon the length of the recording session, this process may result in thousands of reconstructed images, all in the precise sequence as they originally appeared on the LCD, and each one a pixel-perfect representation of the original.

If, for example, the LCD was displaying at a rate of 30 frames per second ("FPS") while the recording was being made, this means that 30 full screen frame images will be reconstructed by the FARR parser for every second of recording time. The parser can also be configured to compress away (i.e., delete or not record) duplicate screen frames (those that have not exhibited any pixel changes since the last screen frame), so as to save disk space.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The tools provided by various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

Various embodiments described herein, while embodying (in some cases) software products, computer-performed methods, and/or computer systems, represent tangible, concrete improvements to existing technological areas, including, without limitation, embedded display technology (including, but not limited to, automotive instrument gauge clusters, other vehicle instrument gauge clusters, medical instrument displays, industrial instrument/equipment displays, etc.), display verification/validation/diagnosis technology, and/or the like. In other aspects, certain embodiments, can improve the functioning of a computer or network system itself (e.g., computing devices or systems that form parts of the network, computing devices or systems, network elements or the like for performing the functionalities described below, etc.), for example, by ensuring, based on pixel-to-pixel comparison of images against baseline or model images of display screen images or display screen frames, that image data streams (or the like) that are sent from an embedded processor of a GUI system to a display device (and captured along the way) are pixel-perfect representations of the baseline or model images (that are intended to be sent to the display device), where captured image data are parsed to obtain pixel data (based on determined protocol for image display, which can differ greatly amongst vendors and manufacturers of display devices), formatted accordingly, reconstructed, and analyzed in an automated fashion, thereby improving functionalities of embedded GUI or HMI systems, and/or the like. In particular, to the extent any abstract concepts are present in the various embodiments, those concepts can be implemented as described herein by devices, software, systems, and methods that involve specific novel functionality (e.g., steps or operations), such as parsing captured and recorded image data that are sent from an embedded processor of a GUI system to a display device of the GUI system to obtain pixel data (based on determined protocol for image display, which can differ greatly amongst vendors and manufacturers of display devices), formatting accordingly, reconstructing screen images, and analyzing the reconstructed screen images in an automated fashion, and/or the like, to name a few examples, that extend beyond mere conventional computer processing operations. These functionalities can produce tangible results outside of the implementing computer system, including, merely by way of example, ability to enable pixel perfect representation of display screen images (that match pixel-to-pixel with baseline or model screen images for the embedded GUI systems), and/or the like, which may be observed or measured by customers and/or service providers.

In an aspect, a method might be provided for implementing user interface diagnostics. The method might comprise sending, with an embedded processor of a graphical user interface ("GUI") system, a first stream of data to a display device; receiving, with the display device, the first stream of data, wherein the first stream of data comprises display data and formatting data, the formatting data comprising information indicating a number of pixels per row and a number of rows, and the display data comprising pixel data comprising color depth for each pixel; formatting, with the display device, the first stream of data to produce one or more first display screen images, based at least in part on the formatting data and on the display data; and displaying, with the display device, the one or more first display screen images, one screen image at a time. The method might further comprise capturing, with a data stream recording system, the first stream of data as the first stream of data is being sent from the embedded processor to the display device, without disturbing the data being sent to the display device and recording, with the data stream recording system, the captured first stream of data. The method might also comprise retrieving, with a computing system, the captured and recorded first stream of data; determining, with the computing system, a display protocol associated with the captured and recorded first stream of data, based at least in part on the formatting data of the captured and recorded first stream of data; parsing, with the computing system, the pixel data from the display data of the captured and recorded first stream of data; and formatting, with the computing system, the parsed pixel data to produce one or more second display screen images, based at least in part on the determined display protocol and on the parsed pixel data.

The method might further comprise determining, with the computing system, whether one or more successive display screen images of the one or more second display screen images is pixel-to-pixel identical to a display screen image of the one or more second display screen images; based on a determination that one or more successive display screen images of the one or more second display screen images is pixel-to-pixel identical to one display screen image of the one or more second display screen images, compressing, with the computing system, the formatted pixel data to produce one or more third display screen images, by deleting the one or more successive display screen images that is determined to be pixel-to-pixel identical to the one display screen image; reconstructing, with the computing system, the one or more first display screen images, based on the one or more third display screen images; and storing, with the computing system and on a data store, the reconstructed one or more first display screen images. The method might additionally comprise comparing, with the computing system, each pixel of each screen image of the reconstructed one or more first display screen images with each pixel of a model screen image of each corresponding unique screen image of the one or more first display screen images that is displayed on the display device; based on a determination that at least one screen image of the reconstructed one or more first display screen images is not pixel-to-pixel identical to the model screen image of a corresponding unique screen image of the one or more first display screen images that is displayed on the display device, logging, with the computing system and in an error log, the at least one screen image as being pixel imperfect and indicating in the error log which pixels of the at least one screen image do not match with corresponding pixels in the model screen image of a corresponding unique screen image of the one or more first display screen images; and based on a determination that each of the screen images of the reconstructed one or more first display images matches pixel-to-pixel with the model screen image of each corresponding unique screen image of the one or more first display screen images that is displayed on the display device, sending, with the computing system, a notification to a user that the one or more first display screen images match corresponding model screen images in a pixel perfect manner.

In another aspect, another method might be provided for implementing user interface diagnostics. The method might comprise retrieving, with a computing system and from a first data store, a first stream of data, the first stream of data comprising display data for producing one or more first display screen images, the first stream data being previously captured and recorded on the first data store by a data stream recording system as the display data is being sent from an embedded processor of a graphical user interface ("GUI") system to a display device, without disturbing the pixel data being sent to the display device. The method might further comprise parsing, with the computing system, pixel data from the display data of the captured and recorded first stream of data; formatting, with the computing system, the parsed pixel data to produce one or more second display screen images; reconstructing, with the computing system, the one or more first display screen images, based on the one or more second display screen images; and comparing, with the computing system, each pixel of each screen image of the reconstructed one or more first display screen images with each pixel of a model screen image of each corresponding screen image of the one or more first display screen images.

In some embodiments, the first stream of data might further comprise formatting data comprising information indicating a number of pixels per row and a number of rows, and the method might further comprise determining, with the computing system, a display protocol associated with the captured and recorded first stream of data, based at least in part on the formatting data of the captured and recorded first stream of data. In such cases, formatting the parsed pixel data to produce the one or more second display screen images might comprise formatting the parsed pixel data to produce one or more second display screen images, based at least in part on the determined display protocol.

According to some embodiments, the one or more second display screen images might comprise a plurality of screen images, and the method might further comprise determining, with the computing system, whether one or more third display screen images of the one or more second display screen images is pixel-to-pixel identical to one fourth display screen image of the one or more second display screen images; and, based on a determination that one or more third display screen images of the one or more second display screen images is pixel-to-pixel identical to one fourth display screen image of the one or more second display screen images, compressing, with the computing system, the formatted pixel data to produce one or more fifth display screen images, by deleting the one or more third display screen images that is determined to be pixel-to-pixel identical to the one fourth display screen image. In such instances, reconstructing, with the computing system, the one or more first display screen images might comprise reconstructing, with the computing system, the one or more first display screen images, based on the one or more fifth display screen images.

In some cases, the method might further comprise, based on a determination that at least one screen image of the reconstructed one or more first display screen images is not pixel-to-pixel identical to the model screen image of a corresponding unique screen image of the one or more first display screen images, logging, with the computing system and in an error log, the at least one screen image as being pixel imperfect and indicating in the error log which pixels of the at least one screen image do not match with corresponding pixels in the model screen image of a corresponding unique screen image of the one or more first display screen images; and storing, with the computing system, the error log on a second data store. Alternatively, or additionally, the method might further comprise, based on a determination that at least one screen image of the reconstructed one or more first display screen images is not pixel-to-pixel identical to the model screen image of a corresponding unique screen image of the one or more first display screen images, sending, with the computing system, a notification to a user indicating that the at least one screen image is pixel imperfect and indicating which pixels of the at least one screen image do not match with corresponding pixels in the model screen image of a corresponding unique screen image of the one or more first display screen images.

In some instances, the method might further comprise, based on a determination that each of the screen images of the reconstructed one or more first display images matches pixel-to-pixel with the model screen image of each corresponding unique screen image of the one or more first display screen images that is displayed on the display device, sending, with the computing system, a notification to a user that the one or more first display screen images match corresponding model screen images in a pixel perfect manner.

According to some embodiments, the display device might be a liquid crystal display ("LCD"). In some embodiments, the data stream recording system might capture the first stream data as the display data is being sent from the embedded processor to the display device, using a pass-through breakout connector that captures stream data without disturbing the stream data being sent. In some embodiments, the method might further comprise performing, with the computing system, a self-diagnostic, by: converting an input video file into a series of still images; decomposing the series of still images into a binary recording file, the binary recording file comprising display data, a selected protocol, and synchronization signals; parsing pixel data from the display data in the binary recording file; formatting the parsed pixel data to produce one or more display screen images, based at least in part on the selected protocol and on the parsed pixel data; reconstructing the one or more still images, based on the one or more display screen images; comparing each pixel of each screen image of the reconstructed one or more still images with each pixel of each corresponding still image of the series of still images; based on a determination that at least one screen image of the reconstructed one or more still images is not pixel-to-pixel identical to the corresponding still image of the series of still images, notifying a user that the computing system has an error; and based on a determination that each screen image of the reconstructed one or more still images is pixel-to-pixel identical to the corresponding still image of the series of still images, notifying a user that the computing system is ready to diagnose the GUI system of the display device.

In yet another aspect, an apparatus might be provided for implementing user interface diagnostics. The apparatus might comprise one or more processors and a non-transitory computer readable medium. The non-transitory computer readable medium might have stored thereon computer software comprising a set of instructions that, when executed by the one or more processors, causes the apparatus to: retrieve, from a first data store, a first stream of data, the first stream of data comprising display data for producing one or more first display screen images, the first stream data being previously captured and recorded on the first data store by a data stream recording system as the display data is being sent from an embedded processor of a graphical user interface ("GUI") system to a display device, without disturbing the pixel data being sent to the display device; parse pixel data from the display data of the captured and recorded first stream of data; format the parsed pixel data to produce one or more second display screen images; reconstruct the one or more first display screen images, based on the one or more second display screen images; and compare each pixel of each screen image of the reconstructed one or more first display screen images with each pixel of a model screen image of each corresponding screen image of the one or more first display screen images.

In some embodiments, the first stream of data might further comprise formatting data comprising information indicating a number of pixels per row and a number of rows, and the set of instructions, when executed by the one or more processors, might further cause the apparatus to determine a display protocol associated with the captured and recorded first stream of data, based at least in part on the formatting data of the captured and recorded first stream of data. In such cases, formatting the parsed pixel data to produce the one or more second display screen images might comprise formatting the parsed pixel data to produce one or more second display screen images, based at least in part on the determined display protocol.

According to some embodiments, the one or more second display screen images might comprise a plurality of screen images, and the set of instructions, when executed by the one or more processors, might further cause the apparatus to: determine whether one or more third display screen images of the one or more second display screen images is pixel-to-pixel identical to one fourth display screen image of the one or more second display screen images; and based on a determination that one or more third display screen images of the one or more second display screen images is pixel-to-pixel identical to one fourth display screen image of the one or more second display screen images, compress the formatted pixel data to produce one or more fifth display screen images, by deleting the one or more third display screen images that is determined to be pixel-to-pixel identical to the one fourth display screen image. In such instances, reconstructing the one or more first display screen images might comprise reconstructing the one or more first display screen images, based on the one or more fifth display screen images.

In some cases, the set of instructions, when executed by the one or more processors, might further cause the apparatus to: based on a determination that at least one screen image of the reconstructed one or more first display screen images is not pixel-to-pixel identical to the model screen image of a corresponding unique screen image of the one or more first display screen images, log, in an error log, the at least one screen image as being pixel imperfect and indicate in the error log which pixels of the at least one screen image do not match with corresponding pixels in the model screen image of a corresponding unique screen image of the one or more first display screen images; and store the error log on a second data store. Alternatively, or additionally, the set of instructions, when executed by the one or more processors, might further cause the apparatus to, based on a determination that at least one screen image of the reconstructed one or more first display screen images is not pixel-to-pixel identical to the model screen image of a corresponding unique screen image of the one or more first display screen images, send a notification to a user indicating that the at least one screen image is pixel imperfect and indicate which pixels of the at least one screen image do not match with corresponding pixels in the model screen image of a corresponding unique screen image of the one or more first display screen images.

In some instances, the set of instructions, when executed by the one or more processors, might further cause the apparatus to, based on a determination that each of the screen images of the reconstructed one or more first display images matches pixel-to-pixel with the model screen image of each corresponding unique screen image of the one or more first display screen images that is displayed on the display device, send a notification to a user that the one or more first display screen images match corresponding model screen images in a pixel perfect manner.

According to some embodiments, the display device might be a liquid crystal display ("LCD"). In some embodiments, the data stream recording system might capture the first stream data as the display data is being sent from the embedded processor to the display device, using a pass-through breakout connector that captures stream data without disturbing the stream data being sent.

In still another aspect, a system might be provided for implementing user interface diagnostics. The system might comprise a data stream recording system and a computing system. The data stream recording system might comprise a pass-through breakout connector that captures stream data without disturbing the stream data being sent; one or more first processors; and a first non-transitory computer readable medium. The first non-transitory computer readable medium might have stored thereon computer software comprising a first set of instructions that, when executed by the one or more first processors, causes the data stream recording system to: capture, using the pass-through breakout connector, a first stream of data as the first stream of data is being sent from an embedded processor of a graphical user interface ("GUI") system to a display device, without disturbing the data being sent to the display device, the first stream of data comprising display data for producing one or more first display screen images; and record, with the data stream recording system, the captured first stream of data on a first data store.

The computing system might comprise one or more second processors; and a second non-transitory computer readable medium. The second non-transitory computer readable medium might have stored thereon computer software comprising a second set of instructions that, when executed by the one or more second processors, causes the computing system to: retrieve, from the first data store, the first stream of data; parse pixel data from the display data of the captured and recorded first stream of data; format the parsed pixel data to produce one or more second display screen images; reconstruct the one or more first display screen images, based on the one or more second display screen images; and compare each pixel of each screen image of the reconstructed one or more first display screen images with each pixel of a model screen image of each corresponding screen image of the one or more first display screen images.

In some embodiments, the first stream of data might further comprise formatting data comprising information indicating a number of pixels per row and a number of rows, and the second set of instructions, when executed by the one or more second processors, might further cause the computing system to determine a display protocol associated with the captured and recorded first stream of data, based at least in part on the formatting data of the captured and recorded first stream of data. In such cases, formatting the parsed pixel data to produce the one or more second display screen images might comprise formatting the parsed pixel data to produce one or more second display screen images, based at least in part on the determined display protocol.

According to some embodiments, the one or more second display screen images might comprise a plurality of screen images, and the second set of instructions, when executed by the one or more second processors, further causes the computing system to: determine whether one or more third display screen images of the one or more second display screen images is pixel-to-pixel identical to one fourth display screen image of the one or more second display screen images; and based on a determination that one or more third display screen images of the one or more second display screen images is pixel-to-pixel identical to one fourth display screen image of the one or more second display screen images, compress the formatted pixel data to produce one or more fifth display screen images, by deleting the one or more third display screen images that is determined to be pixel-to-pixel identical to the one fourth display screen image. In such instances, reconstructing the one or more first display screen images might comprise reconstructing the one or more first display screen images, based on the one or more fifth display screen images.

In some cases, the second set of instructions, when executed by the one or more second processors, might further cause the computing system to: based on a determination that at least one screen image of the reconstructed one or more first display screen images is not pixel-to-pixel identical to the model screen image of a corresponding unique screen image of the one or more first display screen images, log, in an error log, the at least one screen image as being pixel imperfect and indicate in the error log which pixels of the at least one screen image do not match with corresponding pixels in the model screen image of a corresponding unique screen image of the one or more first display screen images; and store the error log on a second data store. Alternatively, or additionally, the second set of instructions, when executed by the one or more second processors, might further cause the computing system to, based on a determination that at least one screen image of the reconstructed one or more first display screen images is not pixel-to-pixel identical to the model screen image of a corresponding unique screen image of the one or more first display screen images, send a notification to a user indicating that the at least one screen image is pixel imperfect and indicate which pixels of the at least one screen image do not match with corresponding pixels in the model screen image of a corresponding unique screen image of the one or more first display screen images.

In some instances, the second set of instructions, when executed by the one or more second processors, might further cause the computing system to, based on a determination that each of the screen images of the reconstructed one or more first display images matches pixel-to-pixel with the model screen image of each corresponding unique screen image of the one or more first display screen images that is displayed on the display device, send a notification to a user that the one or more first display screen images match corresponding model screen images in a pixel perfect manner.

According to some embodiments, the display device might be a liquid crystal display ("LCD").

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-4 illustrate some of the features of the method, system, and apparatus for implementing user interface validation or diagnostics, and, in particular embodiments, to methods, systems, and computer software for implementing automated forensic artifact reconstruction and replay ("FARR") of captured and recorded display interface streams ("CARDIS"), as referred to above. The methods, systems, and apparatuses illustrated by FIGS. 1-4 refer to examples of different embodiments that include various components and steps, which can be considered alternatives or which can be used in conjunction with one another in the various embodiments. FIGS. 5 and 6 illustrate example screen images among a plurality of screen images of various example human-machine interfaces, in accordance with the various embodiments. The description of the illustrated methods, systems, apparatuses, and example human-machine interfaces (or screen images thereof) shown in FIGS. 1-6 is provided for purposes of illustration and should not be considered to limit the scope of the different embodiments.

With reference to the figures, FIG. 1 is a schematic diagram illustrating a system 100 for implementing automated forensic artifact reconstruction and replay ("FARR") of captured and recorded display interface streams ("CARDIS"), in accordance with various embodiments. In FIG. 1, system 100 might comprise a data stream recording system 105 (which might correspond to the CARDIS system as described above). System 100 might further comprise a graphical user interface ("GUI") or human-machine interface ("HMI") system 110, which might include, without limitation, an embedded GUI or HMI system for an automobile instrument gauge cluster (e.g., for display of tachometer, speedometer, engine temperature, fuel levels, windshield washer fluid levels, mileage gauge, gas mileage, etc.), an automobile central control console (e.g., for navigation display control, environmental settings control (e.g., air conditioner, heater, etc.), entertainment settings or playback control, etc.), a medical instrument display (e.g., for display of a patient's heart rate, blood oxygen levels, blood pressure, etc.), an aircraft instrument gauge cluster (e.g., for display of altitude, air speed, engine status for each engine, air craft position and heading, degree of pitch, degree of yaw, fuel levels, aileron position and control, flap position and control, rudder position and control, elevator position and control, landing gear position and control, etc.), an industrial equipment/instrument display (e.g., for display of operating temperatures, positions and functions of instruments/equipment, safety gauge statuses, alert statuses, etc.), and/or the like.

The GUI or HMI system 110 might include, but is not limited to, an embedded processor 115 and a display device 120, in some cases connected to each other via a cable 125 (including, but not limited to, a ribbon cable, a serial bus cable, a universal serial bus cable, and/or the like). The embedded processor 115 might include, without limitation, a microprocessor, an array of microprocessors, and/or the like. The display device might include, but is not limited to, a liquid crystal display ("LCD") device, a light emitting diode ("LED") display, an organic LED ("oLED") display, and/or the like. The data stream recording system 105 might comprise a cable 135 and a data capture device 130, which is coupled to the cable 135. The cable 135, like cable 125, might include, without limitation, a ribbon cable, a serial bus cable, a universal serial bus cable, a parallel data cable, and/or the like. The data capture device 130 might include, but is not limited to, a pass-through breakout connector or the like that captures stream data without disturbing the stream data being sent. As data is being sent or streamed (whether serially or in parallel) from the embedded processor 115 to the display device 120 via the cable 125, the data capture device 130 might capture or "sniff" the stream of data or stream of electronic signals representing data, without disturbing any of the stream of data, the normal operation of the display device, or the display device's surrounding embedded microprocessor system. In some instances, the stream of data or electronic signals might include, without limitation, a multi-channel stream of electronic data, binary data, and/or the like that are sent from a display interface controller onboard the embedded processor 115, the data stream having encoded within itself all pixel data representing the images that are sent by the display interface controller to the display device 120 for visual display. The data stream recording system 105 then stores the captured data in a database 140a, which might be located local to (i.e., as part of or within) the data stream recording system 105, located in close proximity but separate from the data stream recording system 105, or located in a remote location from the data stream recording system 105 yet accessible via a network connection, or the like.

The system might further comprise computing system 145 (which might correspond to the FARR system as described above). The computing system 145, which might be in direct communication with database 140a or in indirect communication with database 140a via network 150 (and/or intermediate devices). In some cases, network 150 might include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

In some embodiments, the computing system 145 might include, without limitation, at least one of a protocol analyzer 155 (optional), a pixel data parser 160, a screen frame formatter 165, a screen frame compressor 170 (optional), an image reconstructor 175, an image analyzer 180, and/or the like. In some cases, one or more of the components 155-180 might be embodied as a processor(s) (such as processor(s)

Figure 3:
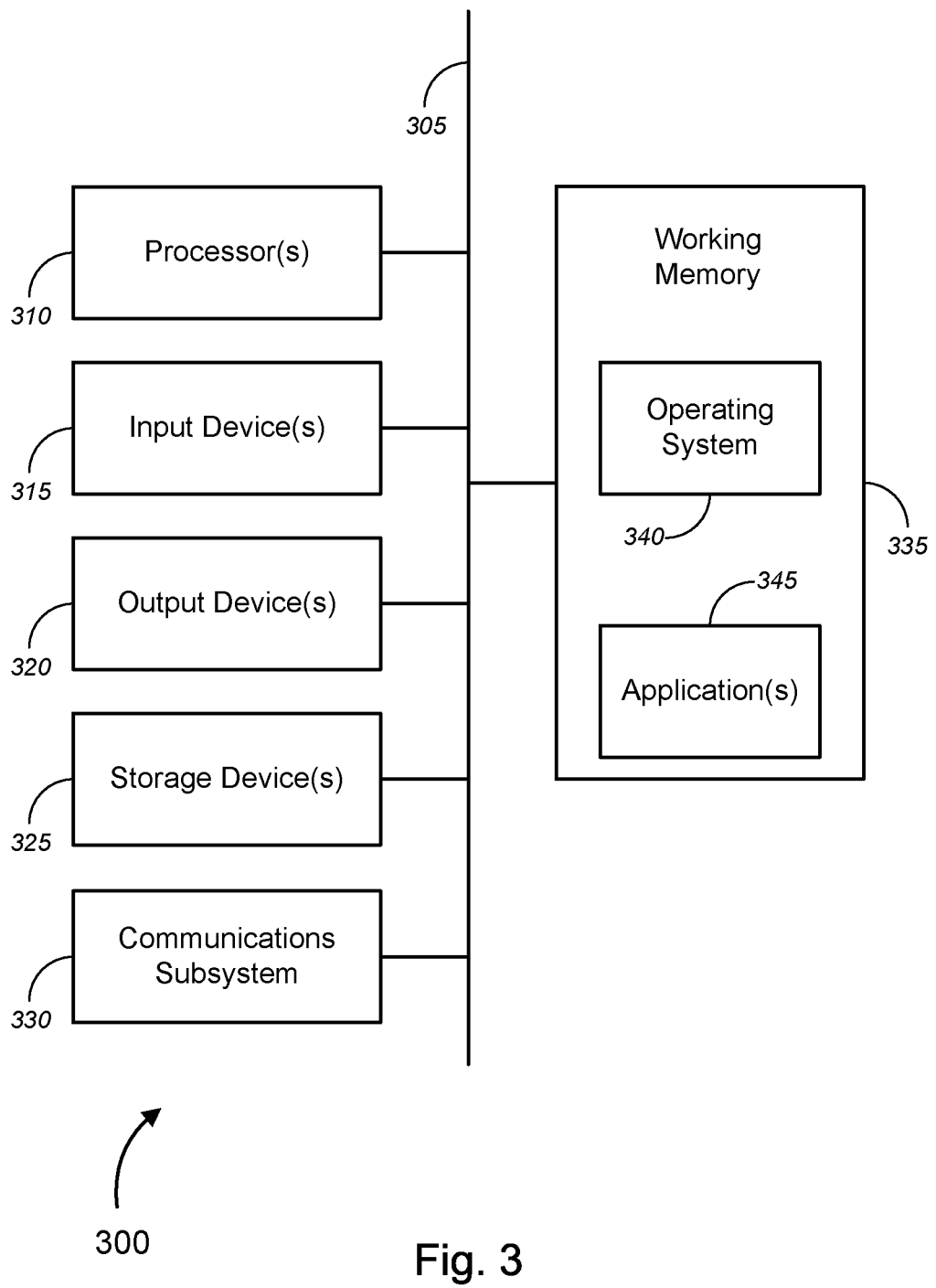
FIG. 3 is a block diagram illustrating an exemplary computer or system hardware architecture, in accordance with various embodiments.

310 of computer or hardware system 300 of FIG. 3, which might represent an embodiment of computing system 145). In some instances, computing system 145 might further comprise a non-transitory computer readable medium (such as storage device(s) 325 of computer or hardware system 300 of FIG. 3, which might represent an embodiment of computing system 145). Even if one or more of the components 155-180 are embodied as one or more processors or the like, for purposes of illustration, these components are described herein as separate components performing distinct functionalities.

In operation, the computing system 145 might retrieve the captured and recorded stream of data from the database 140a (in some cases, directly from database 140a; in other cases, via intermediate local devices (not shown); in yet other cases, via network 150 (and/or intermediate devices (local or remote; not shown)). Protocol analyzer 155 (if present or implemented) might determine a display protocol associated with the captured and recorded stream of data, in some cases, based at least in part on formatting data of the captured and recorded stream of data. In such cases, the formatting data (which might be sent in the stream of data from the embedded processor 115 to the display device 120) might include, without limitation, information indicating a number of pixels per row and a number of rows, synchronization signals, and/or the like. In some instances, the synchronization signals might include, without limitation, at least one of a pixel clock signal, vertical sync or synchronization signals, horizontal sync or synchronization signals, data enable signals, and/or the like, which provide information to the display device 120 (or the computing system 145, or the like) regarding when to begin a new screen frame, when to begin a new screen row, and/or the like. The pixel data parser 160 might parse pixel data from display data of the captured and recorded stream of data. Here, the display data might include, without limitation, pixel data comprising color depth for each pixel; the display data might be sent in the stream of data from the embedded processor 115 to the display device 120. The screen frame formatter 165 might format the parsed pixel data to produce one or more display screen images, in some cases, based at least in part on the determined display protocol (if any).

In some cases, the screen frame compressor 170 (if present or implemented) might determine whether the pixels in one screen display image has changed in one or more subsequent screen display images, or whether the display is static or unchanged over a period of time (e.g., seconds or milliseconds) as the data was being displayed on the display screen (as captured and recorded by the data stream recording system). If it is determined that the pixels in one screen display image has not changed or is static over a period of time, the screen frame compressor 170 might compress away duplicate display screen images (e.g., by deleting or not saving/recording the duplicate or identical sequential screen frames or screen images), thereby saving disk space. The image reconstructor 175 might reconstruct the display screen images (as were, or would have been, displayed by the display device 120), in some cases based on the formatted one or more display screen images or based on the compressed one or more display screen images (if applicable). According to some embodiments, the reconstructed display screen images might be stored in database 140b, which might be located local to (i.e., as part of or within) the computing system 145, located in close proximity but separate from the computing system 145, or located in a remote location from the computing system 145 yet accessible via a network connection (e.g., via network 150 or the like), and the like.

The image analyzer 180 might subsequently compare each pixel of each screen image of the reconstructed one or more display screen images with each pixel of a model screen image of each corresponding screen image of the one or more display screen images (as were, or would have been, displayed by the display device 120). In some instances, model screen images might be stored on another database (not shown) or might be stored in one (or both) of the databases 140a and/or 140b. In some cases, the another database might be different or separate from each of the databases 140a and 140b, and might be located local to (i.e., as part of or within) the computing system 145, located in close proximity but separate from the computing system 145, or located in a remote location from the computing system 145 yet accessible via a network connection (e.g., via network 150 or the like), or the like.

In some embodiments, based on a determination that at least one screen image of the reconstructed one or more display screen images is not pixel-to-pixel identical to (i.e., not a pixel perfect representation of) the model screen image of a corresponding unique screen image of the one or more display screen images, the computing system 145 might log, in an error log, the at least one screen image as being pixel imperfect and indicating in the error log which pixels of the at least one screen image do not match with corresponding pixels in the model screen image and might store the error log in a database (e.g., one of database 140a or 140b, or the another database, or the like). Alternatively, or additionally, the computing system 145 might, based on such determination, a notification to a user indicating that the at least one screen image is pixel imperfect and indicating which pixels of the at least one screen image do not match with corresponding pixels in the model screen image. In some instances, the notification might be sent to a user device 185, which might be associated with the user. In some cases, the user device 185 might include, without limitation, at least one of a tablet computer, a smart phone, a mobile phone, a personal digital assistant, a smart watch, a laptop computer, a desktop computer, a display device, and/or the like, and might either be directed communicatively coupled to the computing system (in a wired manner or wirelessly), or communicatively coupled via network 150 (and/or intermediate devices (not shown)).

According to some embodiments, based on a determination that all the screen images or screen frames are pixel-perfect representations of corresponding model screen images or model screen frames, the computing system might send a notification to the user (i.e., by sending to one or more user devices 185 associated with the user) that the one or more display screen images match corresponding model screen images in a pixel-perfect manner. In some embodiments, the notification or the contents of such notification might also be saved in a log file and stored in one of the database (e.g., one of database 140a or 140b, or the another database, or the like), in a similar manner as the error log file (as described above). In some cases, the log file and/or the error log file might be part of detailed verification logs or the like that are stored in one or more of the databases described above. Merely by way of example, in some instances, a plurality of the reconstructed one or more display screen images may be converted into video frames or the like that are subsequently stored in one or more of the databases described above.

In an overview of an embodiment of system 100, once the data stream recording system 105 (i.e., the CARDIS system) has provided a recording file of a display session (e.g., a LCD display session, or the like) that occurred on an embedded processor 115 (e.g., embedded microprocessor, or the like), that recording is parsed by the computing system 145 (i.e., the FARR system), which then reconstructs "artifacts" from the recording. In some cases, the artifacts might be the LCD images themselves, which are recreated in their entirety with pixel-perfect integrity. The computing system 145 display screen images (e.g., LCD screen images, or the like) from raw recorded data (e.g., raw recorded binary data, or the like) contained in the data stream (e.g., in the LCD display interface stream). Many different methodologies, schemes, and/or protocols (herein referred to collectively as "protocols") are typically used by various embedded microprocessors to encode pixel data en route to a display device (e.g., an LCD display device, or the like). The computing system 145 (e.g., the protocol analyzer 155 thereof) is able to decipher and decode any and all of these protocols and to recover (e.g., with the pixel data parser 160, the screen frame formatter 165, and the image reconstructor 175, and/or the like) pixel-perfect image data for every image in the recording file. The computing system 145 not only reconstructs the images, but once the images have been reconstructed, the computing system 145 can also replay the reconstructed images in identical fashion as they occurred originally on the embedded microprocessor display (e.g., embedded microprocessor LCD, or the like). This replay can be implemented via an interface to a physical display device (e.g., physical LCD or the like), or else to a virtual one, rendered on any computer display screen (e.g., display screen of a laptop computer, a desktop computer, a tablet computer, a smart phone, etc.).

The replay of the reconstructed images facilitates automated comparisons, image-by-image, against a library of baselines, models, or the like, even to the extent of determining whether or not each image from the embedded processor display (e.g., embedded microprocessor LCD, or the like) is pixel-perfect. The computing system 145 can be easily automated to process any number of CARDIS recordings, produce detailed verification logs, create videos by converting its recreated images into video frames, and/or the like. These achievements represent the foundation of automated embedded GUI or HMI testing.

In some embodiments, the computing system 145 (which might correspond to the FARR system described above), might be capable of performing self-diagnostics to determine whether its forensic artifact and replay functionalities are operating normally or are malfunctioning (or not otherwise fully functional). In a self-diagnosis mode, which is intended to allow the system to automatically and thoroughly determine its own health (or level of functionality) before the system is actually employed to diagnose any external device under test ("DUT"), the computing system 145 (corresponding to the FARR portion of the system 100) is outfitted with or otherwise configured with the ability to synthesize its own data stream recording system (or CARDIS) recording file, using any existing video file as input. The input video file is converted into a series of still images, which are then decomposed into a binary recording file, complete with display/pixel data, a selected protocol, and synchronization signals, identical to a real recording file that would be produced by the data stream recording system 105 (corresponding to the CARDIS system described above). That synthesized binary recording file is subsequently parsed by computing system 145 (corresponding to FARR), just as a real recording file would be, and all the still images are then reconstructed. These reconstructed images can then be automatically binary-compared against the original images that were converted from the input video file. Any errors that occur during this self-diagnosis mode indicate the computing system 145 (i.e., FARR system) itself is not healthy (i.e., not fully functional or not functioning properly), and the computing system 145, in some cases, might automatically send a notification to a user to report this malfunction or operational status of the computing system 145.

Figure 2A:
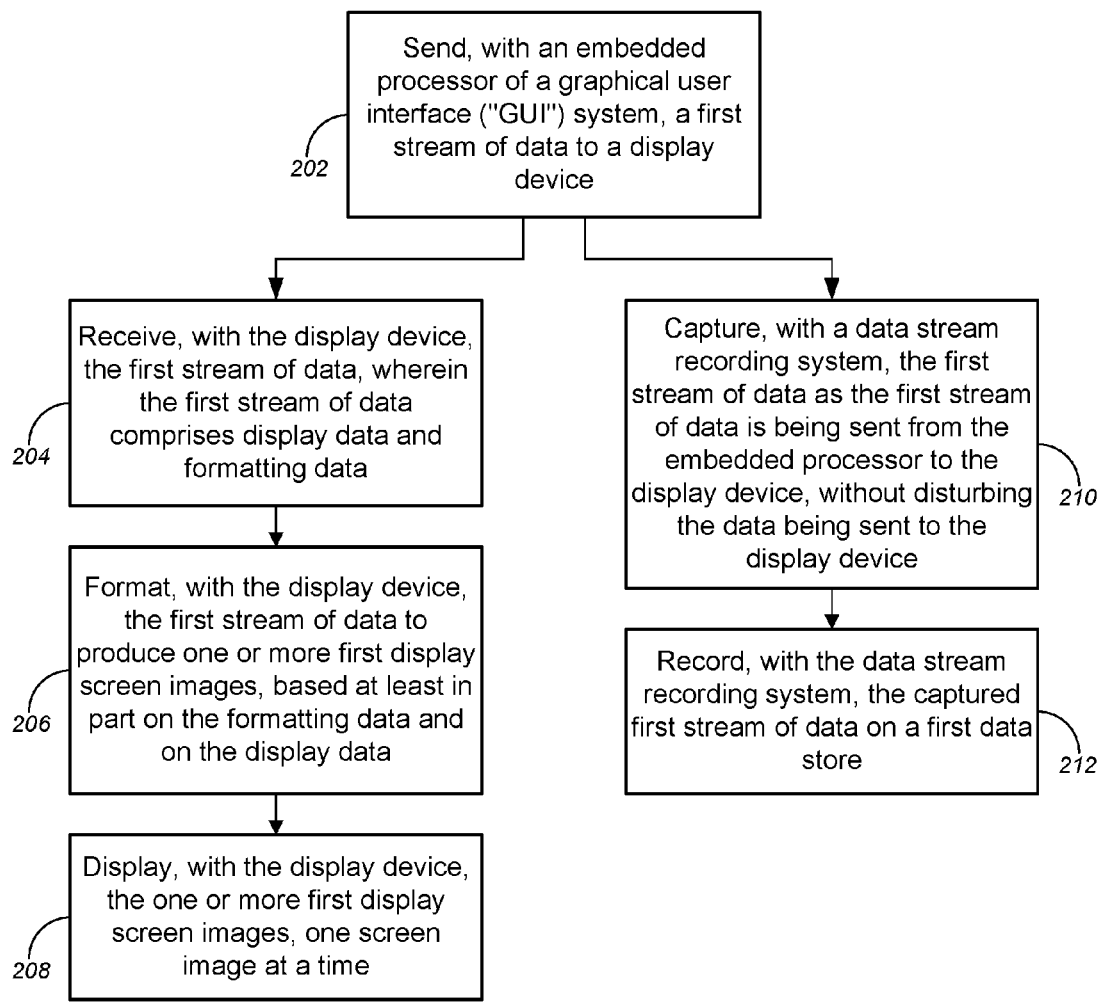
FIGS. 2A-2C are flow diagrams illustrating a method for implementing automated forensic artifact reconstruction and replay of captured and recorded display interface streams, in accordance with various embodiments.
Figure 2B:
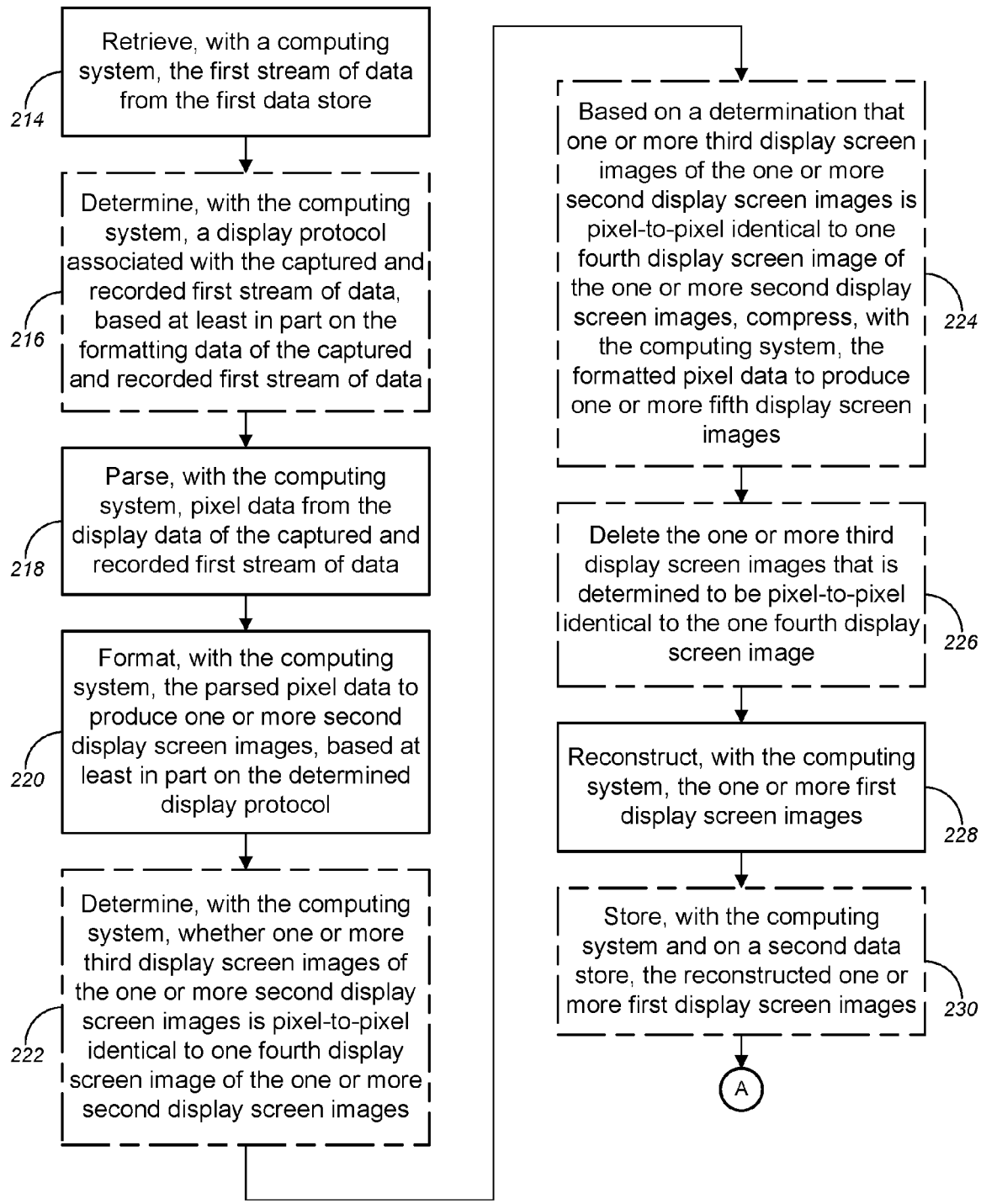
Figure 2C:
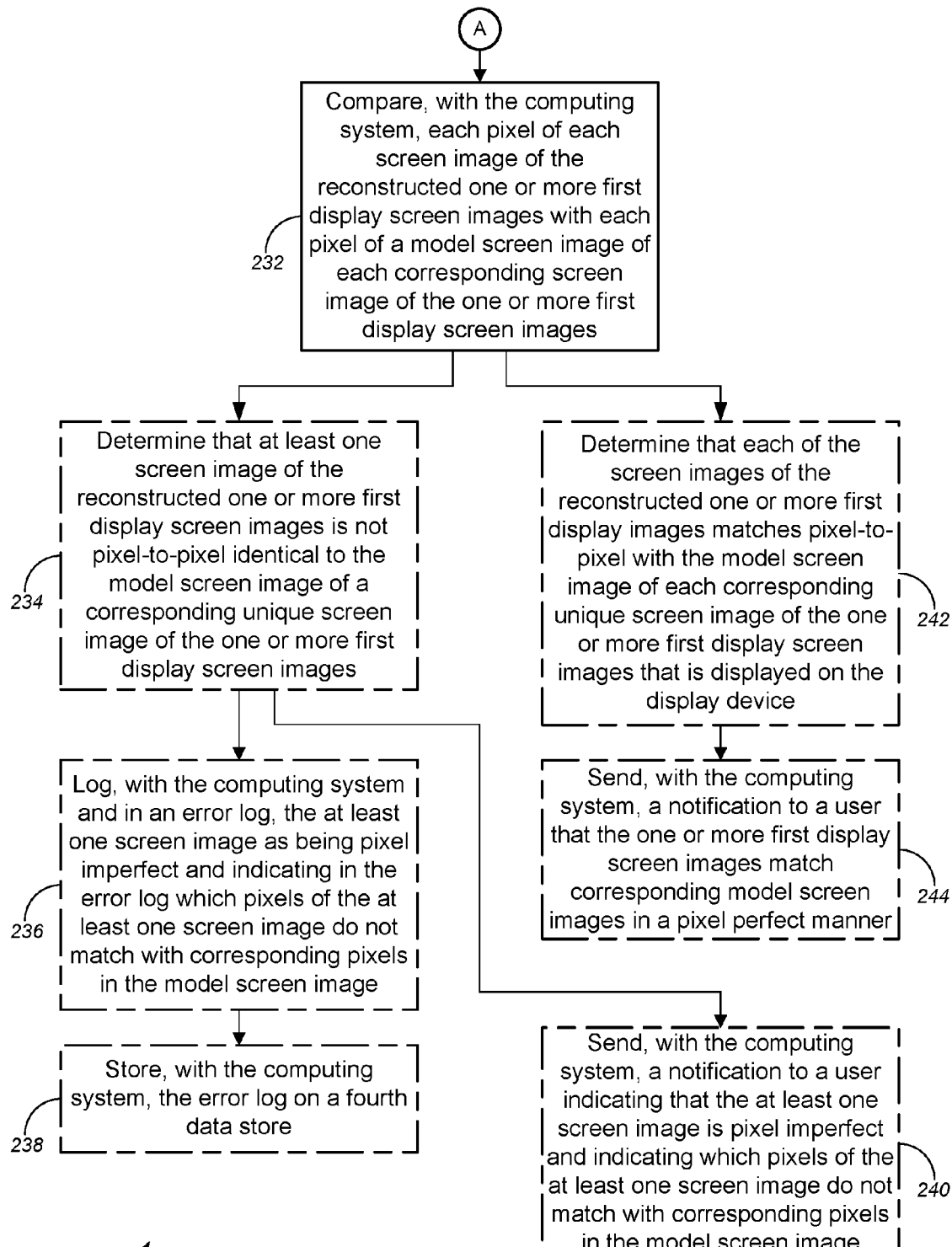

FIGS. 2A-2C (collectively, "FIG. 2") are flow diagrams illustrating a method 200 for implementing automated forensic artifact reconstruction and replay of captured and recorded display interface streams, in accordance with various embodiments. FIG. 2A depicts processes for capturing and recording streams of data as the data are being sent from the embedded processor of a graphical user interface ("GUI") system to a display device, while FIGS. 2B and 2C depict processes for analyzing, reconstructing, and comparing the reconstructed display screen images against corresponding model images of such screen images. In FIG. 2, method 200 in FIG. 2B continues onto FIG. 2C, linked by the circular marker denoted by "A."

While the techniques and procedures are depicted and/or described in a certain order for purposes of illustration, it should be appreciated that certain procedures may be reordered and/or omitted within the scope of various embodiments. Moreover, while the method illustrated by FIG. 2 can be implemented by or with (and, in some cases, are described below with respect to) the system 100 of FIG. 1 (or components thereof), such method may also be implemented using any suitable hardware (or software) implementation. Similarly, while the system 100 of FIG. 1 (or components thereof), can operate according to the method illustrated by FIG. 2 (e.g., by executing instructions embodied on a computer readable medium), the system 100 of FIG. 1 can also operate according to other modes of operation and/or perform other suitable procedures.

With reference to FIG. 2A, method 200, according to some embodiments, might comprise, at block 202, sending, with an embedded processor (e.g., embedded processor 115 of FIG. 1) of a graphical user interface ("GUI") or human-machine interface ("HMI") system (e.g., GUI system 110 of FIG. 1), a first stream of data to a display device (e.g., display device 120 of FIG. 1).

At block 204, method 200 might comprise receiving, with the display device, the first stream of data. The first stream of data might include, but is not limited to, display data and formatting data, or the like. In some cases, the display data might include, without limitation, pixel data comprising color depth for each pixel, while the formatting data might include, but is not limited to, information indicating a number of pixels per row and a number of rows, or the like. In some cases, the formatting data might further include synchronization signals, which might include, without limitation, at least one of a pixel clock signal, vertical sync or synchronization signals, horizontal sync or synchronization signals, data enable signals, and/or the like, which provide information to a display device (or the computing system, such as computing system 145 or the like) regarding when to begin a new screen frame, when to begin a new screen row, and/or the like. Method 200 might further comprise, at block 206, formatting, with the display device, the first stream of data to produce one or more first display screen images, in some cases, based at least in part on the formatting data and on the display data. Method 200 might further comprise displaying, with the display device, the one or more first display screen images, one screen image at a time (i.e., in sequence in the stream of data) (block 208).

Method 200, at block 210, might comprise capturing, with a data stream recording system (e.g., data stream recording system 105 of FIG. 1 or the like), the first stream of data as the first stream of data is being sent from the embedded processor to the display device, without disturbing the data being sent from the embedded processor to the display device, and without disturbing the normal operation of the display device (e.g., liquid crystal display ("LCD") device or the like) or its surrounding embedded microprocessor system. In some cases, the data stream recording system might utilize a pass-through breakout connector or the like that captures stream data without disturbing the stream data being sent. At block 212, method 200 might comprise recording, with the data stream recording system, the captured first stream of data on a first data store, which might be located local to the data stream recording system, located in close proximity but separate from the data stream recording system, or located in a remote location from the data stream recording system yet accessible via a network connection, or the like.

We now turn to FIG. 2B. Method 200 might further comprise, at block 214, retrieving, with a computing system (e.g., computing system 145 of FIG. 1, or the like), the first stream of data from the first data store (by either directly accessing the first data store or indirectly accessing the first data store via a network and/or intermediate systems, or the like). In some embodiments, method 200 might further comprise determining, with the computing system, a display protocol associated with the captured and recorded first stream of data, based at least in part on the formatting data of the captured and recorded first stream of data (optional block 216). At block 218, method 200 might comprise parsing, with the computing system, pixel data from the display data of the captured and recorded first stream of data. Method 200 might further comprise formatting, with the computing system, the parsed pixel data to produce one or more second display screen images, based at least in part on the determined display protocol (block 220).

At optional block 222, according to some embodiments, method 200 might comprise determining, with the computing system, whether one or more third display screen images of the one or more second display screen images is pixel-to-pixel identical to one fourth display screen image of the one or more second display screen images. In other words, the computing system determines whether the pixels in one screen display image has changed in one or more subsequent screen display images, or whether the display is static or unchanged over a period of time (e.g., seconds or milliseconds) as the data was being displayed on the display screen (as captured and recorded by the data stream recording system). Method 200 might further comprise, at optional block 224, based on a determination that one or more third display screen images of the one or more second display screen images is pixel-to-pixel identical to one fourth display screen image of the one or more second display screen images (i.e., based on a determination that the pixels in one screen display image has not changed or is static over a period of time), compressing, with the computing system, the formatted pixel data to produce one or more fifth display screen images. In some cases, compressing the formatted pixel data might include deleting identical (or duplicate) display screen images or not saving/recording the identical (or duplicate) display screen images (optional block 226). In this manner, disk space can be saved, particularly, where the total display screen images that eventually are sent to and displayed on display device number in the scores, hundreds, or even thousands. For instance, depending on the length of the recording session (at blocks 210 and 212), the process might result in thousands of screen display images, all in the precise sequence as they originally appeared on the display device (at block 208), and each one a pixel-perfect representation of the original. If, for example, the display device was displaying at a rate of 30 frames per second while the recording was being made, the computing system would eventually reconstruct 30 full screen frame images for every second of recording time. To save disk space, then, duplicate screen frames (i.e., those that have not exhibited any pixel changes since the last screen frame) can be compressed away (i.e., deleted or not saved/recorded, or the like).

At block 228, method 200 might comprise reconstructing, with the computing system, the one or more first display screen images (either based on the one or more second images or based on the one or more fifth display screen images, depending on whether or not the processes at optional blocks 222-226 were implemented). Method 200, at optional block 230, might comprise storing, with the computing system and on a second data store, the reconstructed one or more first display screen images. In some cases, the first and second data store might be the same data store. In other cases, the first and second data stores might be different or separate databases, and the second data store might be located local to the computing system, located in close proximity but separate from the computing system, or located in a remote location from the computing system yet accessible via a network connection, or the like. The process subsequently proceeds to block 232 in FIG. 2C (following marker "A").

With reference to FIG. 2C, method 200 might further comprise comparing, with the computing system, each pixel of each screen image of the reconstructed one or more first display screen images with each pixel of a model screen image of each corresponding screen image of the one or more first display screen images (block 232). In some instances, model screen images might be stored on a third data store, which might be the same data store as one (or both) of the first and second data store. In some cases, the third data store might be different or separate from each of the first and second data stores, and the third data store might be located local to the computing system, located in close proximity but separate from the computing system, or located in a remote location from the computing system yet accessible via a network connection, or the like.

At optional block 234, method 200 might comprise determining that at least one screen image of the reconstructed one or more first display screen images is not pixel-to-pixel identical to the model screen image of a corresponding unique screen image of the one or more first display screen images. Based on such determination, method 200 might further comprise logging, with the computing system and in an error log, the at least one screen image as being pixel imperfect and indicating in the error log which pixels of the at least one screen image do not match with corresponding pixels in the model screen image (optional block 236) and storing, with the computing system, the error log on a fourth data store (optional block 238). In some cases, the fourth data store, which might be the same data store as at least one of the first, second, and/or third data stores. In some instances, the fourth data store might be different or separate from each of the first, second, and third data stores, and the fourth data store might be located local to the computing system, located in close proximity but separate from the computing system, or located in a remote location from the computing system yet accessible via a network connection, or the like. Alternatively, or additionally, based on such determination, method 200 might further comprise, at optional block 240, sending, with the computing system, a notification to a user indicating that the at least one screen image is pixel imperfect and indicating which pixels of the at least one screen image do not match with corresponding pixels in the model screen image. In some instances, the notification might be sent to a user device (e.g., user device 185 of FIG. 1, or the like), which might be associated with the user. In some cases, the user device might include, without limitation, at least one of a tablet computer, a smart phone, a mobile phone, a personal digital assistant, a smart watch, a laptop computer, a desktop computer, a display device, and/or the like.

After the comparison at block 232, method 200 might further comprise, at optional block 242) determining that each of the screen images of the reconstructed one or more first display images matches pixel-to-pixel with the model screen image of each corresponding unique screen image of the one or more first display screen images that is displayed on the display device (at block 208). In other words, it is determined that all the screen images or screen frames are pixel-perfect representations of corresponding model screen images or model screen frames. Based on such determination, method 200 might further comprise sending, with the computing system, a notification to the user that the one or more first display screen images match corresponding model screen images in a pixel-perfect manner (optional block 244). In some embodiments, the notification or the contents of such notification might also be saved in a log file and stored in one of the data stores (e.g., the fourth data store), in a similar manner as the error log file (at optional blocks 236 and 238).

Exemplary System and Hardware Implementation

FIG. 3 is a block diagram illustrating an exemplary computer or system hardware architecture, in accordance with various embodiments. FIG. 3 provides a schematic illustration of one embodiment of a computer system 300 of the service provider system hardware that can perform the methods provided by various other embodiments, as described herein, and/or can perform the functions of computer or hardware system (i.e., data stream recording system 105, GUI system 110, computing system 145, and/or the like), or of any other device (e.g., user device 185, etc.), as described above. It should be noted that FIG. 3 is meant only to provide a generalized illustration of various components, of which one or more (or none) of each may be utilized as appropriate. FIG. 3, therefore, broadly illustrates how individual system elements may be implemented in a relatively separated or relatively more integrated manner.

The computer or hardware system 300—which might represent an embodiment of the computer or hardware system (i.e., data stream recording system 105, GUI system 110, computing system 145, and/or the like), or of any other device (e.g., user device 185, etc.), described above with respect to FIGS. 1 and 2—is shown comprising hardware elements that can be electrically coupled via a bus 305 (or may otherwise be in communication, as appropriate). The hardware elements may include one or more processors 310, including, without limitation, one or more general-purpose processors and/or one or more special-purpose processors (such as digital signal processing chips, graphics acceleration processors, and/or the like); one or more input devices 315, which can include, without limitation, a mouse, a keyboard, and/or the like; and one or more output devices 320, which can include, without limitation, a display device, a printer, and/or the like.

The computer or hardware system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 300 might also include a communications subsystem 330, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 330 may permit data to be exchanged with a network (such as the network described below, to name one example), with other computer or hardware systems, and/or with any other devices described herein. In many embodiments, the computer or hardware system 300 will further comprise a working memory 335, which can include a RAM or ROM device, as described above.

The computer or hardware system 300 also may comprise software elements, shown as being currently located within the working memory 335, including an operating system 340, device drivers, executable libraries, and/or other code, such as one or more application programs 345, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer or hardware system 300 and/or might take the form of source and/or installable code, which, upon compilation and/or installation on the computer or hardware system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 300) to perform methods in accordance with various embodiments of the invention. According to a set of embodiments, some or all of the procedures of such methods are performed by the computer or hardware system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 300, various computer readable media might be involved in providing instructions/code to processor(s) 310 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 325. Volatile media includes, without limitation, dynamic memory, such as the working memory 335. In some alternative embodiments, a computer readable medium may take the form of transmission media, which includes, without limitation, coaxial cables, copper wire and fiber optics, including the wires that comprise the bus 305, as well as the various components of the communication subsystem 330 (and/or the media by which the communications subsystem 330 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 300. These signals, which might be in the form of electromagnetic signals, acoustic signals, optical signals, and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
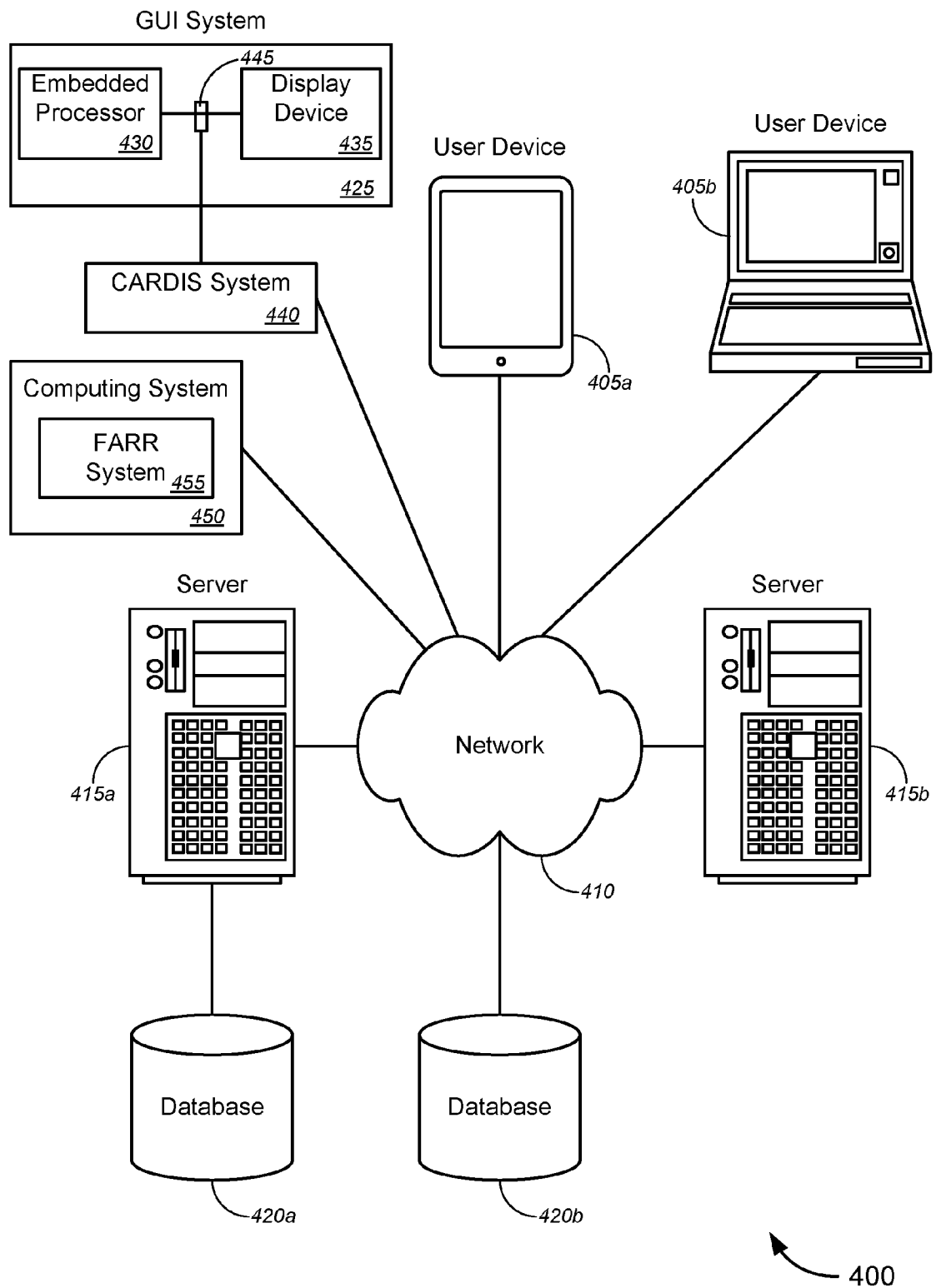
FIG. 4 is a block diagram illustrating a networked system of computers, which can be used in accordance with various embodiments.

As noted above, a set of embodiments comprises methods and systems for user interface validation or diagnostics, and, in particular embodiments, to methods, systems, and computer software for implementing automated forensic artifact reconstruction and replay ("FARR") of captured and recorded display interface streams ("CARDIS"). FIG. 4 illustrates a schematic diagram of a system 400 that can be used in accordance with one set of embodiments. The system 400 can include one or more user computer or user device 405. A user computer or user device 405 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer or user device 405 can also have any of a variety of applications, including one or more applications configured to perform methods provided by various embodiments (as described above, for example), as well as one or more office applications, database client and/or server applications, and/or web browser applications. Alternatively, a user computer or user device 405 can be any other electronic device, such as a thin-client computer, Internet-enabled mobile telephone, and/or personal digital assistant, capable of communicating via a network (e.g., the network(s) 410 described below) and/or of displaying and navigating web pages or other types of electronic documents. Although the exemplary system 400 is shown with two user computers or user devices 405, any number of user computers or user devices can be supported.

Certain embodiments operate in a networked environment, which can include a network(s) 410. The network(s) 410 can be any type of network familiar to those skilled in the art that can support data communications using any of a variety of commercially-available (and/or free or proprietary) protocols, including, without limitation, TCP/IP, SNA™, IPX™, AppleTalk™, and the like. Merely by way of example, the network(s) 410 (similar to network 150 of FIG. 1, respectively, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 415. Each of the server computers 415 may be configured with an operating system, including, without limitation, any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 might be a data server, a web server, a cloud computing device(s), or the like, as described above. The data server might include (or be in communication with) a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one or more application servers, which can be configured with one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer or user device 405 and/or another server 415. In some embodiments, an application server can perform one or more of the processes for implementing user interface validation or diagnostics, and, in particular embodiments, to methods, systems, and computer software for implementing automated forensic artifact reconstruction and replay ("FARR") of captured and recorded display interface streams ("CARDIS"), or the like, as described in detail above. Data provided by an application server may be formatted as one or more web pages (comprising HTML, JavaScript, etc., for example) and/or may be forwarded to a user computer 405 via a web server (as described above, for example). Similarly, a web server might receive web page requests and/or input data from a user computer 405 and/or forward the web page requests and/or input data to an application server. In some cases, a web server may be integrated with an application server.

In accordance with further embodiments, one or more servers 415 can function as a file server and/or can include one or more of the files (e.g., application code, data files, etc.) necessary to implement various disclosed methods, incorporated by an application running on a user computer 405 and/or another server 415. Alternatively, as those skilled in the art will appreciate, a file server can include all necessary files, allowing such an application to be invoked remotely by a user computer or user device 405 and/or server 415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420a and 420b (collectively, "databases 420"). The location of each of the databases 420 is discretionary: merely by way of example, a database 420a might reside on a storage medium local to (and/or resident in) a server 415a (and/or a user computer or user device 405). Alternatively, a database 420b can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 420 can be a relational database, such as an Oracle database, that is adapted to store, update, and retrieve data in response to SQL-formatted commands. The database might be controlled and/or maintained by a database server, as described above, for example.

According to some embodiments, system 400 might further comprise a graphical user interface ("GUI") or human-machine interface ("HMI") system 425 (similar to GUI system 110 of FIG. 1, or the like). The GUI system 425 might comprise an embedded processor 430 and a display device 435 (e.g., a liquid crystal display ("LCD") device, or the like). In some embodiments, system 400 might further comprise a data stream recording system 440 (e.g., a capture and record display interface streams ("CARDIS") system, or the like), which is similar to data stream recording system 105 of FIG. 1, or the like. In some instances, the data stream recording system 440 might comprise a pass-through breakout connector or similar connector 445 that captures stream data being sent from the embedded processor 430 to the display device 435 of the GUI system 425, without disturbing the stream data being sent. The data stream recording system 440 then records the captured stream data on a data store (e.g., database 420a or 420b, or the like), which may be local relative to the data stream recording system 440 (not shown), or accessible over network 410 (as shown in FIG. 4), or the like.

According to some embodiments, system 400 might further comprise a computing system 450 (similar to computing system 145 of FIG. 1, or the like), which might comprise a forensic artifact reconstruction and replay ("FARR") system 455. The FARR system might comprise one or more of a protocol analyzer (similar to protocol analyzer 155 of FIG. 1, or the like), a pixel data parser (similar to pixel data parser 160 of FIG. 1, or the like), a screen frame formatter (similar to screen frame formatter 165 of FIG. 1, or the like), a screen frame compressor (similar to screen frame compressor 170 of FIG. 1, or the like), an image reconstructor (similar to image reconstructor 175 of FIG. 1, or the like), an image analyzer (similar to image analyzer 180 of FIG. 1, or the like), and/or the like. In operation, the FARR system 455 might perform one or more of the following: retrieve, from the data store (e.g., database 420a or 420b, or the like), the captured and recorded stream data; determine, with the protocol analyzer, a display protocol associated with the captured and recorded stream data, based at least in part on the formatting data of the captured and recorded stream data; parse, with the pixel parser, pixel data from the display data of the captured and recorded stream data; format, with the screen frame formatter, the parsed pixel data to produce one or more display screen images; compress, with the screen frame compressor, the formatted pixel data by deleting display screen images that are determined to be pixel-to-pixel identical to other display screen images in the set of display screen images; reconstruct, with the image reconstructor, the one or more display screen images; and compare each pixel of each screen image of the reconstructed one or more display screen images with each pixel of a model screen image of each corresponding screen image (as was displayed by the display device 435); and/or the like. Based on the results of the comparison, the FARR system 455 might send a notification to the user device 405a or 405b, via network 410, to indicate that at least one screen image is pixel imperfect (while indicating which pixels of the at least one screen image do not match with corresponding pixels in the model screen image of a corresponding unique screen image) or that the one or more display screen images (i.e., all display screen images in the set of display screen images) match corresponding model screen images in a pixel perfect manner. Alternatively or additionally, for the pixel imperfect result, the FARR system 455 might log, in an error log, the at least one screen image as being pixel imperfect and indicate in the error log which pixels of the at least one screen image do not match with corresponding pixels in the model screen image of a corresponding unique screen image, while, for the pixel perfect result, the FARR system 455 might log, in the same error log, that the one or more display screen images (i.e., all display screen images in the set of display screen images) match corresponding model screen images in a pixel perfect manner.

Examples of Screen Images for Embedded GUI or HMI Systems

Figure 5A:
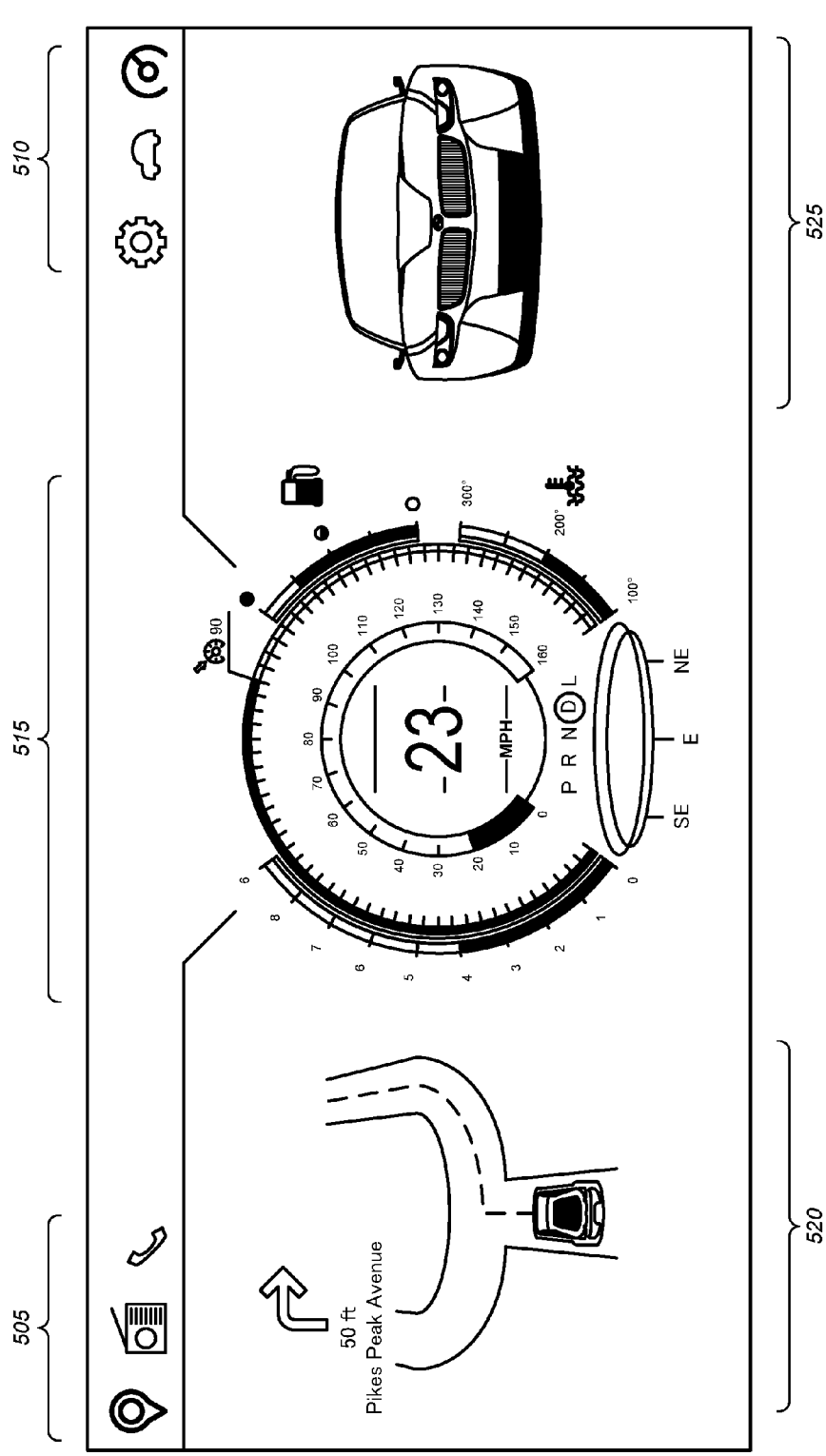
FIGS. 5A and 5B are diagrams illustrating example screen images among a plurality of screen images of an example automobile instrument gauge that may be recorded and reconstructed, in accordance with various embodiments.
Figure 5B:
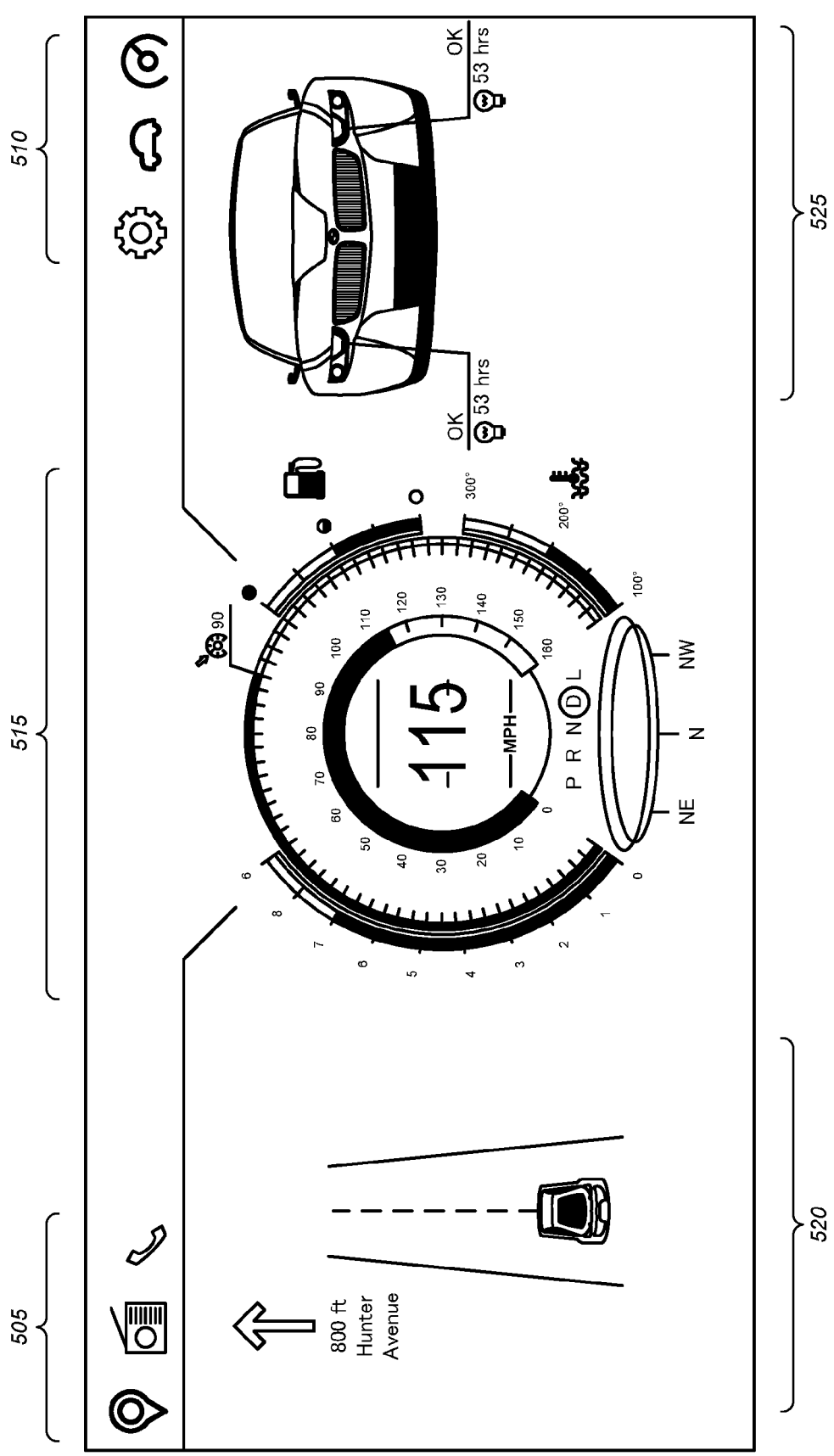
Figure 6A:
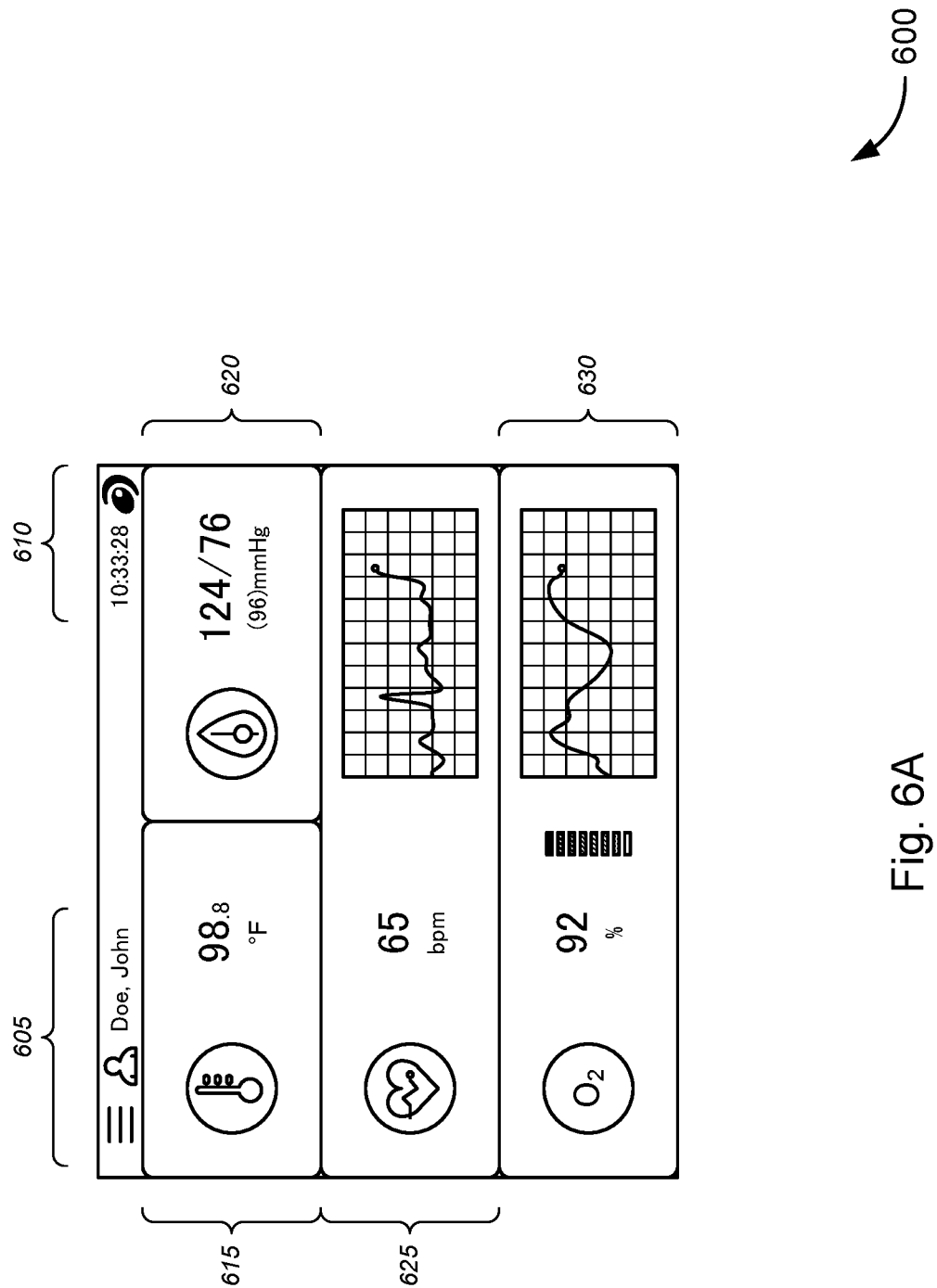
FIGS. 6A and 6B are diagrams illustrating example screen images among a plurality of screen images of an example medical instrument display that may be recorded and reconstructed, in accordance with various embodiments.
Figure 6B:
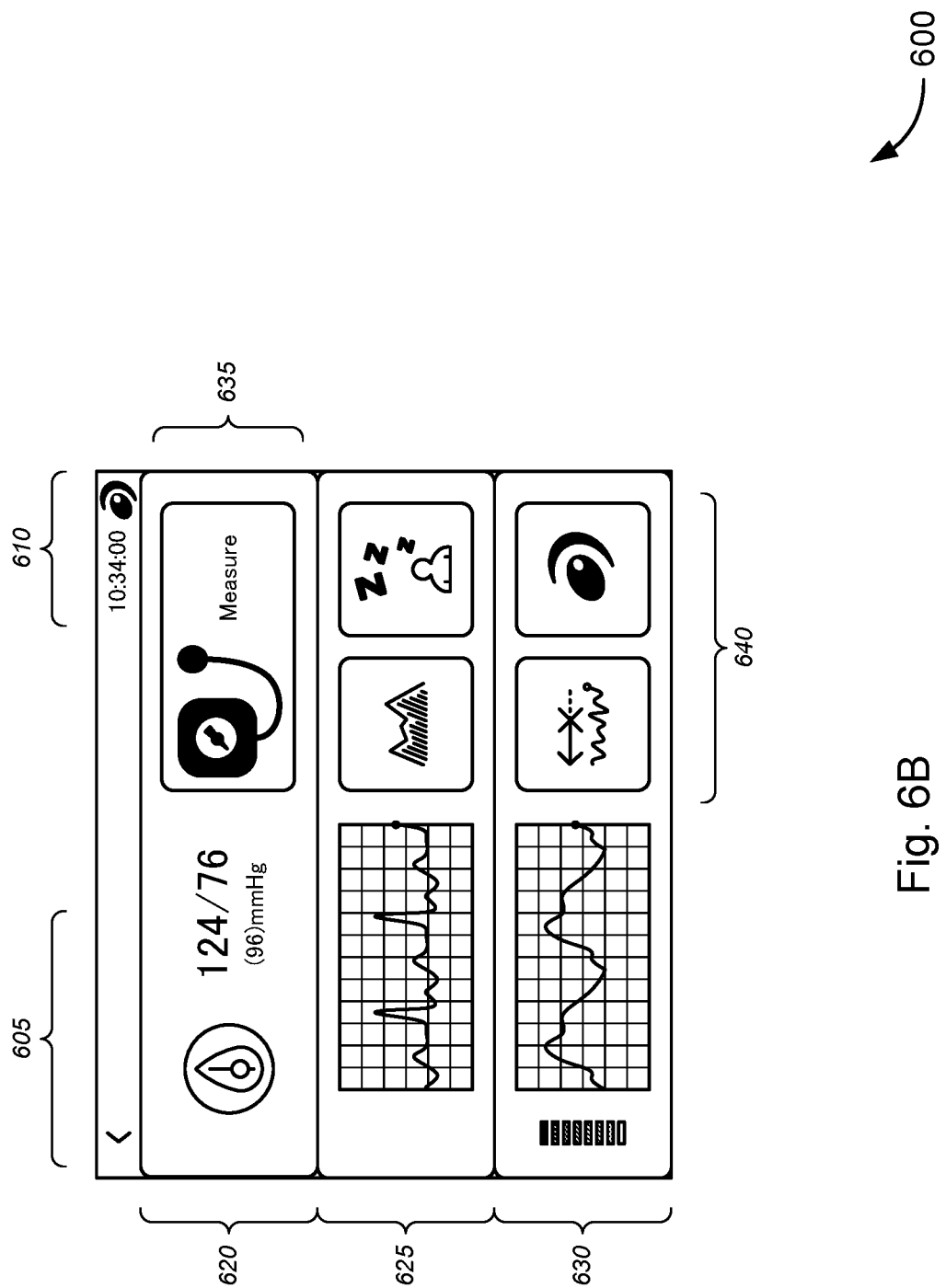

We now turn to various embodiments for embedded GUI or HMI systems, examples of screen images of which are shown in FIGS. 5A-6B. In particular, FIGS. 5A and 5B (collectively, "FIG. 5") are diagrams illustrating example screen images among a plurality of screen images of an example automobile instrument gauge 500 that may be recorded and reconstructed, in accordance with various embodiments. FIGS. 6A and 6B (collectively, "FIG. 6") are diagrams illustrating example screen images among a plurality of screen images of an example medical instrument display 600 that may be recorded and reconstructed, in accordance with various embodiments.

With reference to FIGS. 5A and 5B, the embodiment of example automobile instrument gauge 500 might include, without limitation, a first mode portion 505, a second mode portion 510, one or more instrument gauge portions 515, a navigation display portion 520, and a vehicle status portion 525. In the example of FIG. 5, the first mode portion 505 might include displays of a navigation icon (which may be highlighted when the navigation mode is turned on, as shown in FIGS. 5A and 5B), a radio or media icon (which may be highlighted when the radio or other media is turned on (not shown)), and a telephone icon (which may be highlighted when the BlueTooth or other wireless telephone system in the car is connected with a user's mobile or smartphone and a telephone call is in progress (not shown)), while the second mode portion 510 might include displays of a settings icon (which may be highlighted when the settings of the GUI or HMI system are being viewed or changed by the user (not shown)), a vehicle status icon (which may be highlighted when the status mode is turned on, as shown in FIG. 5B), and a cruise-control icon (which may be highlighted when the cruise-control mode is turned on (although it may not be engaged), as shown in FIGS. 5A and 5B). Other icons may be displayed as desired, as designed, or as appropriate. In the example of FIG. 5, the navigation icon in the first mode portion 505 is highlighted (e.g., by thicker icon lines (as shown), or by one or more of different icon color, different background color, different icon illumination setting, and/or different background illumination setting (not shown), or the like) when the navigation mode is engaged as shown in the navigation display portion 520 in which an icon of the vehicle is shown in relation to a map of the street in which the vehicle is driving (or in a simulation of driving) with directions for driving to a particular destination.

The one or more instrument gauge portions 515 might include, without limitation, one or more of a speedometer, a tachometer, a fuel gauge, an engine temperature gauge, a compass, a driving mode indicator of the vehicle (i.e., in an automatic transmission vehicle, indicating whether the vehicle is parked, is in reverse, is in neutral, is in drive, or is in low gear, or the like, or, in a manual transmission vehicle, indicating whether the vehicle is in which of the first through $N^{th}$ gear or is in reverse, and the like). In FIG. 5, the cruise-control setting may be on (as indicated by the highlighted cruise-control icon (which can be highlighted in a manner similar to that as described above with respect to the navigation icon)), but may not be engaged (as the cruise-control setting that is overlaid on the speedometer is not highlighted). When engaged, the cruise-control setting that is overlaid on the speedometer might be highlighted, and the speed of the vehicle will be limited to the speed as set by the cruise-control setting (which in the embodiment of FIG. 5 is set at 90 mph, but can be set to another speed by the user).

In the embodiment of FIG. 5, the vehicle status portion 525 might display an image of the vehicle or at least a representation of the vehicle (and its component parts or sections), and, as shown in FIG. 5B, can also display status reports on instruments or equipment in the vehicle, including, but not limited to, status of the headlights (shown), status of other lights (including, but not limited to, turn signal lights, brake lights, etc.) (not shown), status of doors (whether open, ajar, or closed) (not shown), status of hood or trunk (whether open, ajar, or closed) (not shown), status of tires (including, but not limited to, temperature of each tire, air pressure in each tire, tread depth of each tire, or tread depth status relative to preset threshold for each tire, slippage of each tire (on slippery surfaces), and/or the like) (not shown), rear-view camera status (not shown), rear-view camera feed (not shown), other sensor status (e.g., radar, lidar, proximity sensors, etc., if installed in vehicle) (not shown), other sensor feeds or indicators (not shown), airbag status (not shown), and/or the like. Comparing FIGS. 5A and 5B, in FIG. 5A the speed of the vehicle (at least in the simulation of the GUI/HMI system) shows that heading into a turn in the road, the vehicle's working speed of the engine (as measured by the tachometer in revolutions per minute) is relatively low and the vehicle's instantaneous speed (as measured by the speedometer in miles per hour) is also relatively low, with a three-quarter full tank of fuel. In FIG. 5B, while on a straight road, the vehicle's working speed of the engine is relatively high and the vehicle's instantaneous speed is also relatively high, with the fuel dropping to half tank.

Turning to FIG. 6A, the embodiment of example medical instrument display 600 might include, without limitation, a first header portion 605, a second header portion 610, and one or more diagnostic display panels 615-630. The first header portion 605 might display a menu icon (which might be highlighted, in a manner similar to highlighting as described above with respect to icons in the automobile instrument gauge embodiments of FIG. 5, when the menu is actuated or selected (not shown)) and a name of the patient (in this case, John Doe). The second header portion might display a date icon (not shown), a time icon (as shown in FIG. 6A), an icon or emblem of the service provider or healthcare provider, and/or the like. The one or more diagnostic display panels might include, without limitation, one or more of a temperature measurement display panel 615, a blood pressure measurement display panel 620, a pulse rate or heart rate measurement display panel 625 (which might include a measured pulse rate, a measured waveform, and/or the like), a blood oxygen or oximeter measurement display panel 630 (which might include a measured blood oxygen level, a blood oxygen gauge, a measured waveform, and/or the like), and the like.

With reference to FIG. 6B, once real-time measurements have been made (or simulations of real-time measurements have concluded), the example medical instrument display 600 might include, but is not limited to, a blood pressure measurement display panel 620 that shows the measured blood pressure of the patient together with an icon of a button 635 for initiating blood pressure measurement, a pulse rate or heart rate measurement display panel 625, and a blood oxygen or oximeter measurement display panel 630, and/or the like. In some embodiments, other icons of buttons 640 may be provided that enable the user (e.g., patient or healthcare provider, and the like) to select other options for the medical instrument or medical diagnostic device.

Although FIGS. 5 and 6 show particular screen images of an example automobile instrument gauge 500 and an example medical instrument display 600, respectively, the various embodiments are not so limited, and other types of instrument displays may be utilized for the GUI or HMI systems, including, but not limited to, automobile climate control GUI or HMI systems, automobile media access/control GUI or HMI systems, aircraft instrument gauge GUI or HMI systems, aircraft passenger media access/control GUI or HMI systems, sea-faring vehicle instrument gauge GUI or HMI systems, sea-faring vehicle passenger media access/control GUI or HMI systems, tablet computer GUI or HMI systems, smart phone GUI or HMI systems, industrial instrument gauge GUI or HMI systems, and/or the like. These GUI or HMI systems may be touchscreen-enabled systems or non-touchscreen/input-device-enabled systems, or the like.

Although only two screen images for the example automobile instrument gauge 500 are shown in FIG. 5, the various embodiments are not so limited, and the series or set of screen images can total any number of screen images dependent upon the number of variations in each variable portion of each screen image (which may be tied to mechanical, electrical, or other systems in the actual vehicle to which the tested GUI or HMI system may eventually or may in-test by connected), as well as being dependent upon the number of landing, option, or display level screens under the main menu screen or main display screen. In some cases, the total number of screen images for an automobile instrument gauge can be in the hundreds, thousands, or more. Moreover, although FIG. 5 shows a combination of instrument gauge plus vehicle image/status display and navigation, the various embodiments are not so limited, and the instrument gauge can be arranged in any suitable manner or orientation, and can display only one of vehicle instrument gauge, navigation, vehicle image, vehicle status, settings, and/or the like at a time, or can display any combination of two or more of these.

Likewise, although only two screen images for the example medical instrument display 600 are shown in FIG. 6, the various embodiments are not so limited, and the series or set of screen images can total any number of screen images dependent upon the number of variations in each variable portion of each screen image (which may be tied to mechanical, electrical, or other systems in the medical instrument or other medical device to which the tested GUI or HMI system may eventually or may in-test by connected), as well as being dependent upon the number of landing, option, or display level screens under the main menu screen or main display screen. In some cases, the total number of screen images for a medical instrument display can be in the hundreds, thousands, or more. Moreover, although FIG. 6 shows a combination of physiological gauges (such as temperature, blood pressure, pulse rate, oxygen level, etc.), the various embodiments are not so limited, and the medical instrument display can be arranged in any suitable manner or orientation, and can display only one of temperature, blood pressure, pulse rate, oxygen level, and/or the like at a time, or can display any combination of two or more of these readings. Further, other readings, scans, or diagnostic measurement of the patient, including, without limitation, cholesterol levels, blood sugar levels, body fat measurements, x-ray scans, CAT scans, etc., can also be displayed.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method for implementing user interface diagnostics, comprising:
    sending, with an embedded processor of a graphical user interface ("GUI") system, a first stream of data to a display device;
    receiving, with the display device, the first stream of data, wherein the first stream of data comprises display data and formatting data, the formatting data comprising information indicating a number of pixels per row and a number of rows, and the display data comprising pixel data comprising color depth for each pixel;
    formatting, with the display device, the first stream of data to produce one or more first display screen images, based at least in part on the formatting data and on the display data;
    displaying, with the display device, the one or more first display screen images, one screen image at a time;
    capturing, with a data stream recording system, the first stream of data as the first stream of data is being sent from the embedded processor to the display device, without disturbing the data being sent to the display device;
    recording, with the data stream recording system, the captured first stream of data;
    retrieving, with a computing system, the captured and recorded first stream of data;
    determining, with the computing system, a display protocol associated with the captured and recorded first stream of data, based at least in part on the formatting data of the captured and recorded first stream of data;
    parsing, with the computing system, the pixel data from the display data of the captured and recorded first stream of data;
    formatting, with the computing system, the parsed pixel data to produce one or more second display screen images, based at least in part on the determined display protocol and on the parsed pixel data;
    determining, with the computing system, whether one or more successive display screen images of the one or more second display screen images is pixel-to-pixel identical to a display screen image of the one or more second display screen images;
    based on a determination that one or more successive display screen images of the one or more second display screen images is pixel-to-pixel identical to one display screen image of the one or more second display screen images, compressing, with the computing system, the formatted pixel data to produce one or more third display screen images, by deleting the one or more successive display screen images that is determined to be pixel-to-pixel identical to the one display screen image;
    reconstructing, with the computing system, the one or more first display screen images, based on the one or more third display screen images;
    storing, with the computing system and on a data store, the reconstructed one or more first display screen images;
    comparing, with the computing system, each pixel of each screen image of the reconstructed one or more first display screen images with each pixel of a model screen image of each corresponding unique screen image of the one or more first display screen images that is displayed on the display device;
    based on a determination that at least one screen image of the reconstructed one or more first display screen images is not pixel-to-pixel identical to the model screen image of a corresponding unique screen image of the one or more first display screen images that is displayed on the display device, logging, with the computing system and in an error log, the at least one screen image as being pixel imperfect and indicating in the error log which pixels of the at least one screen image do not match with corresponding pixels in the model screen image of a corresponding unique screen image of the one or more first display screen images; and
    based on a determination that each of the screen images of the reconstructed one or more first display images matches pixel-to-pixel with the model screen image of each corresponding unique screen image of the one or more first display screen images that is displayed on the display device, sending, with the computing system, a notification to a user that the one or more first display screen images match corresponding model screen images in a pixel perfect manner.

2. The method of claim 1, further comprising:
    based on a determination that at least one screen image of the reconstructed one or more first display screen images is not pixel-to-pixel identical to the model screen image of a corresponding unique screen image of the one or more first display screen images, sending, with the computing system, a notification to a user indicating that the at least one screen image is pixel imperfect and indicating which pixels of the at least one screen image do not match with corresponding pixels in the model screen image of a corresponding unique screen image of the one or more first display screen images.

3. The method of claim 1, wherein the display device is a liquid crystal display ("LCD").

4. The method of claim 1, wherein the data stream recording system captures the first stream data as the display data is being sent from the embedded processor to the display device, using a pass-through breakout connector that captures stream data without disturbing the stream data being sent.

5. The method of claim 1, further comprising:
    performing, with the computing system, a self-diagnostic, by:
    converting an input video file into a series of still images;
    decomposing the series of still images into a binary recording file, the binary recording file comprising display data, a selected protocol, and synchronization signals;
    parsing pixel data from the display data in the binary recording file;

formatting the parsed pixel data to produce one or more display screen images, based at least in part on the selected protocol and on the parsed pixel data;

reconstructing the one or more still images, based on the one or more display screen images;

comparing each pixel of each screen image of the reconstructed one or more still images with each pixel of each corresponding still image of the series of still images;

based on a determination that at least one screen image of the reconstructed one or more still images is not pixel-to-pixel identical to the corresponding still image of the series of still images, notifying a user that the computing system has an error; and based on a determination that each screen image of the reconstructed one or more still images is pixel-to-pixel identical to the corresponding still image of the series of still images, notifying a user that the computing system is ready to diagnose the GUI system of the display device.

6. An apparatus for implementing user interface diagnostics, comprising:

one or more processors; and a non-transitory computer readable medium, the non-transitory computer readable medium having stored thereon computer software comprising a set of instructions that, when executed by the one or more processors, causes the apparatus to:

retrieve, from a first data store, a first stream of data, the first stream of data comprising display data for producing one or more first display screen images, the first stream data being previously captured and recorded on the first data store by a data stream recording system as the display data is being sent from an embedded processor of a graphical user interface ("GUI") system to a display device, using a pass-through breakout connector that captures stream data without disturbing the pixel data being sent to the display device, wherein the first stream of data further comprises formatting data comprising information indicating a number of pixels per row and a number of rows, and the display data comprises pixel data comprising color depth for each pixel;

determine a display protocol associated with the captured and recorded first stream of data, based at least in part on the formatting data of the captured and recorded first stream of data;

parse pixel data from the display data of the captured and recorded first stream of data;

format the parsed pixel data to produce one or more second display screen images, based at least in part on the determined display protocol and on the parsed pixel data;

determine whether one or more successive display screen images of the one or more second display screen images is pixel-to-pixel identical to a display screen image of the one or more second display screen images;

based on a determination that one or more successive display screen images of the one or more second display screen images is pixel-to-pixel identical to one display screen image of the one or more second display screen images, compress the formatted pixel data to produce one or more third display screen images, by deleting the one or more successive display screen images that is determined to be pixel-to-pixel identical to the one display screen image;

reconstruct the one or more first display screen images, based on the one or more third display screen images;

store the reconstructed one or more first display screen images on a data store;

compare each pixel of each screen image of the reconstructed one or more first display screen images with each pixel of a model screen image of each corresponding screen image of the one or more first display screen images;

based on a determination that at least one screen image of the reconstructed one or more first display screen images is not pixel-to-pixel identical to the model screen image of a corresponding unique screen image of the one or more first display screen images that is displayed on the display device, log, in an error log, the at least one screen image as being pixel imperfect and indicating in the error log which pixels of the at least one screen image do not match with corresponding pixels in the model screen image of a corresponding unique screen image of the one or more first display screen images; and based on a determination that each of the screen images of the reconstructed one or more first display images matches pixel-to-pixel with the model screen image of each corresponding unique screen image of the one or more first display screen images that is displayed on the display device, send a notification to a user that the one or more first display screen images match corresponding model screen images in a pixel perfect manner.

7. The apparatus of claim 6, wherein the set of instructions, when executed by the one or more processors, further causes the apparatus to:

based on a determination that at least one screen image of the reconstructed one or more first display screen images is not pixel-to-pixel identical to the model screen image of a corresponding unique screen image of the one or more first display screen images, send a notification to a user indicating that the at least one screen image is pixel imperfect and indicate which pixels of the at least one screen image do not match with corresponding pixels in the model screen image of a corresponding unique screen image of the one or more first display screen images.

8. The apparatus of claim 6, wherein the display device is a liquid crystal display ("LCD").

9. A system for implementing user interface diagnostics, comprising:

a data stream recording system, comprising:

a pass-through breakout connector that captures stream data without disturbing the stream data being sent;

one or more first processors; and a first non-transitory computer readable medium, the first non-transitory computer readable medium having stored thereon computer software comprising a first set of instructions that, when executed by the one or more first processors, causes the data stream recording system to:

capture, using the pass-through breakout connector, a first stream of data as the first stream of data is being sent from an embedded processor of a graphical user interface ("GUI") system to a display device, without disturbing the data being sent to the display device, the first stream of data comprising display data for producing one or more first display screen images, wherein the first stream of data further comprises formatting data comprising information indicating a number of pixels per row and a number of rows, and the display data comprises pixel data comprising color depth for each pixel; and record, with the data stream recording system, the captured first stream of data on a first data store;

a computing system, comprising:

one or more second processors; and a second non-transitory computer readable medium, the second non-transitory computer readable medium having stored thereon computer software comprising a second set of instructions that, when executed by the one or more second processors, causes the computing system to:

retrieve, from the first data store, the first stream of data;

determine a display protocol associated with the captured and recorded first stream of data, based at least in part on the formatting data of the captured and recorded first stream of data;

parse pixel data from the display data of the captured and recorded first stream of data;

format the parsed pixel data to produce one or more second display screen images, based at least in part on the determined display protocol and on the parsed pixel data;

determine whether one or more successive display screen images of the one or more second display screen images is pixel-to-pixel identical to a display screen image of the one or more second display screen images;

based on a determination that one or more successive display screen images of the one or more second display screen images is pixel-to-pixel identical to one display screen image of the one or more second display screen images, compress the formatted pixel data to produce one or more third display screen images, by deleting the one or more successive display screen images that is determined to be pixel-to-pixel identical to the one display screen image;

reconstruct the one or more first display screen images, based on the one or more third display screen images;

store the reconstructed one or more first display screen images on a data store;

compare each pixel of each screen image of the reconstructed one or more first display screen images with each pixel of a model screen image of each corresponding screen image of the one or more first display screen images;

based on a determination that at least one screen image of the reconstructed one or more first display screen images is not pixel-to-pixel identical to the model screen image of a corresponding unique screen image of the one or more first display screen images that is displayed on the display device, log, in an error log, the at least one screen image as being pixel imperfect and indicating in the error log which pixels of the at least one screen image do not match with corresponding pixels in the model screen image of a corresponding unique screen image of the one or more first display screen images; and based on a determination that each of the screen images of the reconstructed one or more first display images matches pixel-to-pixel with the model screen image of each corresponding unique screen image of the one or more first display screen images that is displayed on the display device, send a notification to a user that the one or more first display screen images match corresponding model screen images in a pixel perfect manner.

10. The system of claim 9, wherein the second set of instructions, when executed by the one or more second processors, further causes the computing system to:

based on a determination that at least one screen image of the reconstructed one or more first display screen images is not pixel-to-pixel identical to the model screen image of a corresponding unique screen image of the one or more first display screen images, send a notification to a user indicating that the at least one screen image is pixel imperfect and indicate which pixels of the at least one screen image do not match with corresponding pixels in the model screen image of a corresponding unique screen image of the one or more first display screen images.

11. The system of claim 9, wherein the display device is a liquid crystal display ("LCD").

* * * * *